(12) United States Patent
Shimanaka et al.

(10) Patent No.: US 9,644,106 B2
(45) Date of Patent: May 9, 2017

(54) AQUEOUS EMULSION SOLUTION, COLORING AGENT COMPOSITION CONTAINING SAID AQUEOUS SOLUTION, AQUEOUS INKJET INK, AND METHOD FOR PRODUCING AQUEOUS EMULSION SOLUTION

(71) Applicant: DAINICHISEIKA COLOR & CHEMICALS MFG. CO., LTD., Tokyo (JP)

(72) Inventors: Hiroyuki Shimanaka, Tokyo (JP); Yoshikazu Murakami, Tokyo (JP); Shinichiro Aoyagi, Tokyo (JP); Sachio Yoshikawa, Tokyo (JP); Mitsuo Yamazaki, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 14/781,217

(22) PCT Filed: Apr. 17, 2014

(86) PCT No.: PCT/JP2014/060925
§ 371 (c)(1),
(2) Date: Sep. 29, 2015

(87) PCT Pub. No.: WO2014/175162
PCT Pub. Date: Oct. 30, 2014

(65) Prior Publication Data
US 2016/0053125 A1    Feb. 25, 2016

(30) Foreign Application Priority Data
Apr. 22, 2013  (JP) .................. 2013-089311

(51) Int. Cl.
| | |
|---|---|
| C08L 53/00 | (2006.01) |
| C09J 7/02 | (2006.01) |
| A61K 9/16 | (2006.01) |
| C04B 35/634 | (2006.01) |
| C08L 33/06 | (2006.01) |
| C09D 11/00 | (2014.01) |
| C09D 11/328 | (2014.01) |
| C09D 17/00 | (2006.01) |
| C08L 33/08 | (2006.01) |
| C08F 293/00 | (2006.01) |
| C09D 153/00 | (2006.01) |
| C09D 11/106 | (2014.01) |
| C09D 11/107 | (2014.01) |

(Continued)

(52) U.S. Cl.
CPC ........ *C09D 11/328* (2013.01); *C08F 293/005* (2013.01); *C08K 5/23* (2013.01); *C08K 5/3417* (2013.01); *C08K 5/3437* (2013.01); *C08L 33/08* (2013.01); *C08L 53/00* (2013.01); *C09B 67/009* (2013.01); *C09D 11/106* (2013.01); *C09D 11/107* (2013.01); *C09D 11/32* (2013.01); *C09D 11/322* (2013.01); *C09D 11/324* (2013.01); *C09D 17/00* (2013.01); *C09D 153/00* (2013.01)

(58) Field of Classification Search
None
See application file for complete search history.

(56) References Cited

U.S. PATENT DOCUMENTS

| | | | |
|---|---|---|---|
| 9,102,777 B2 | 8/2015 | Shimanaka et al. | |
| 2006/0270756 A1* | 11/2006 | Hanmura | C09D 11/322 523/160 |

(Continued)

FOREIGN PATENT DOCUMENTS

| | | |
|---|---|---|
| JP | 2002-194037 | 7/2002 |
| JP | 2003520279 | 7/2003 |

(Continued)

OTHER PUBLICATIONS

International Search Report, issued in the corresponding PCT application No. PCT/JP2014/060925, dated Jul. 29, 2014, 5 pages.
Extended European Search Report issued in the corresponding European patent application No. 14787463.0, dated Nov. 7, 2016, 7 pages.
Supplemental European Search Report, dated Jun. 17, 2015, cited in the corresponding European Patent Application No. 11860846.2, 5 pages.

(Continued)

*Primary Examiner* — Susannah Chung
*Assistant Examiner* — Robert T Butcher
(74) *Attorney, Agent, or Firm* — Hamre, Schumann, Mueller & Larson, P.C.

(57) ABSTRACT

A novel aqueous emulsion solution is provided that can be used as a binder for forming a coating film suitable for an inkjet printing system. The present invention is an aqueous emulsion solution containing a polymer I and a polymer II mixed together therein, wherein the polymer I is an A-B block copolymer formed from 90 mass % or more of a methacrylate-based monomer, the A-B block copolymer neutralized with an alkali, a polymer block A is substantially water-insoluble and has a number average molecular weight of 1000 to 10000 and a polydispersity index of 1.5 or less, a polymer block B is synthesized using a monomer containing at least a methacrylic acid and has an acid value of 30 to 250 mgKOH/g, the A-B block copolymer has a number average molecular weight of 5000 to 20000, a content of the polymer block A of 5 to 60% in the A-B block copolymer, and a polydispersity index as a whole of 1.6 or less, the polymer II is a polymer obtained by polymerizing a hydrophobic addition polymerizable monomer and having a glass transition temperature of 70° C. or lower, and further the mass ratio of the polymer I and the polymer II is 5 to 80:95 to 20.

16 Claims, 1 Drawing Sheet

(51) Int. Cl.
*C09D 11/32* (2014.01)
*C09B 67/46* (2006.01)
*C08K 5/23* (2006.01)
*C08K 5/3417* (2006.01)
*C08K 5/3437* (2006.01)
*C09D 11/322* (2014.01)
*C09D 11/324* (2014.01)

(56) References Cited

U.S. PATENT DOCUMENTS

2011/0223529 A1\* 9/2011 Shimanaka ......... C08F 293/005
　　　　　　　　　　　　　　　　　　　　430/108.4
2013/0338273 A1   12/2013 Shimanaka et al.

FOREIGN PATENT DOCUMENTS

| | | |
|---|---|---|
| JP | 2004197090 | 7/2004 |
| JP | 2005179679 | 7/2005 |
| JP | 2007197640 | 8/2007 |
| JP | 2008-019431 | 1/2008 |
| JP | 2008-231130 | 10/2008 |
| JP | 2010-018663 | 1/2010 |
| JP | 2010526887 | 8/2010 |
| JP | 2011241259 | 12/2011 |
| JP | 2012021120 | 2/2012 |
| JP | 2012036251 | 2/2012 |
| JP | 2012092317 | 5/2012 |
| JP | 2012211228 | 11/2012 |
| WO | 2009/076567 | 6/2009 |
| WO | 2010/013651 | 2/2010 |
| WO | 2012085541 | 6/2012 |
| WO | 2012/124212 | 9/2012 |

\* cited by examiner

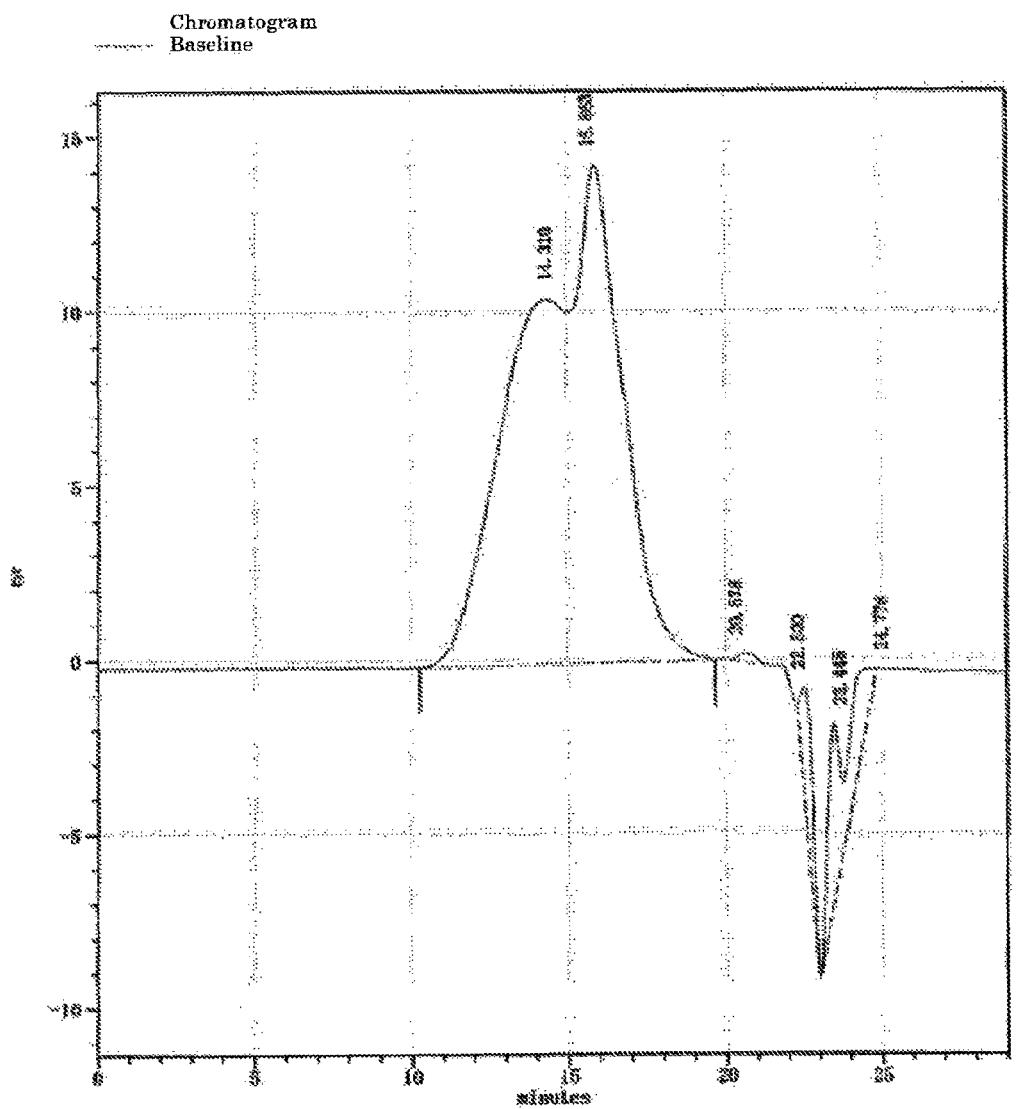

AQUEOUS EMULSION SOLUTION, COLORING AGENT COMPOSITION CONTAINING SAID AQUEOUS SOLUTION, AQUEOUS INKJET INK, AND METHOD FOR PRODUCING AQUEOUS EMULSION SOLUTION

TECHNICAL FIELD

The present invention relates to: an aqueous emulsion solution that is suitable for printing with an inkjet printing system and that is a component of a coating film; a coloring agent composition and an aqueous inkjet ink containing the aqueous emulsion solution; and further a method for producing an aqueous emulsion solution.

BACKGROUND ART

Various kinds of use application of inkjet printers for personal use, office use, various types of business use, and for document recording, for displaying color images, and for color photographs have been emerged due to their high functionalization. Furthermore, the use application has been extended to industrial use where high speed printing is required. The development of aqueous pigment-based inkjet inks has been advancing toward production of finer pigment particles in the ink for the purpose of improving the clearness, color vividness, color density, etc. of pigments. On the other hand, ejection droplets (ink droplets) are becoming finer associated with the development toward high speed printing and high image quality by improving devices. These improvements bring about outstandingly high image quality on processed paper, particularly photo paper and wide format printing paper, etc. for inkjet. However, the extension of the use application to the inkjet printing system in recent years is not limited to these kinds of paper, and, as listed below, a high printing adaptability to various kinds of paper quality (material quality) has been required, however, with the conventional technologies, a problem that printed characters or printed images (printed matter) are rubbed off when rubbed with a finger has occurred depending on the kind of paper or film.

For example, printing on films has been conducted as industrial use, however the maintenance of the adhesiveness of a printed coating film formed by printing is required at a high level. Moreover, with respect to the films used for printing, there exist films having a wide variety of material quality such as polyvinyl chloride-based films, polyolefin-based films, PET films, and polystyrene-based films, however the realization of the printed matter having a high adhesiveness to any one of those films has been required.

In order to solve the problems and requirements described above, it becomes necessary to add a binder for forming a printed coating film into the inks, and the following performance has been required for the binders. That is to say, it has been considered that the binder that is applicable to substrates having various types of paper quality, that is a binder for forming a coating film by which a high adhesiveness is achieved to film substrates having various types of material quality, and that makes an ink, when the binder is contained in the ink, favorable in terms of inkjet printability (high speed printability and ejection stability) is required. Moreover, it sometimes occurs that inks dry on a head or the like of a printer in inkjet inks, and it has been considered that the "redissolvability" by which, even when the inks dry in the head or the like, a colorant is dissolved or dispersed in water again with a cleaning liquid or the ink itself is required as a particular performance in inkjet inks. Hereinafter, paper sheets and films as a substrate for printing are sometimes referred together to as the "substrates".

Facing the above-described requirements, various binders as an additive have been developed. For example, a water-soluble polymer solution or a polymer emulsion solution that can usually be a coating film component, such as an acryl-based, urethane-based, or vinyl-based water-soluble polymer solution or polymer emulsion solution, has been added to the inks. However, when the water-soluble polymers are used, the polymers dissolve in a water-based media in aqueous pigment-based inks, thereby making the viscosity of the inks high, and therefore there is a problem that the water-soluble polymers are not suitable for inkjet inks. Further, with respect to the water-soluble polymers, it sometimes occurs that a polymer which exhibits water-solubility by making an alkali neutralized product from the polymer having a carboxy group is used, however there exist the following problems. That is to say, in this case, the water-solubility can be made high and the redissolvability of the inks becomes favorable by increasing the concentration of carboxy groups, however since the polymers dissolve, the viscosity of the inks tends to become high, and, moreover, the inks exhibit non-Newtonian viscosity and therefore it sometimes occurs that the inks, when applied to inkjet printing, cannot be favorably ejected. Furthermore, since the amount of carboxy groups is large, there has been a problem that the water fastness of the formed coating film may sometimes be poor.

Moreover, on the contrary, the following advantages are obtained by using a water-soluble polymer in which the concentration of the carboxy groups is lowered, however, in this case, there occurs another problem. By lowering the concentration of the carboxy group, the solubility of the polymer disappears and the polymer becomes in a form of particles, thereby taking a form of aqueous dispersion or emulsion, and therefore the viscosity of inks can be lowered. Further, since the concentration of carboxy group is low, the water fastness of the printed matter becomes favorable, and since the polymer is hydrophobic, the adhesiveness with substrates is improved. However, since the water solubility of the polymer is poor, there is a problem that the redissolvability of inks by which the inks dissolve or disperse again in a water-based medium becomes poor when the inks dry. In order to solve this problem, a water-soluble solvent has separately been used in the conventional technologies.

On the other hand, examples of the polymer emulsion used for inkjet inks include an emulsion obtained by emulsion polymerization using a publicly known low molecular weight surface active agent or reactive surface active agent and a self-emulsifying type emulsion obtained by adding a small amount of monomer having a carboxy group, then subjecting the monomer to polymerization, and neutralizing the resultant polymer. However, since the polymer itself becomes a high molecular weight polymer to improve the adhesiveness to the substrates in these polymer emulsions, once the emulsions turn into a coating film by drying, the coating film does not dissolve in water-based media, therefore it sometimes occurs that the redispersibility becomes poor, and there has been a problem that the redissolvability of inks that is particularly important in inkjet inks cannot be realized (see, Patent Literatures 1 to 3).

CITATION LIST

Patent Literature

Patent Literature 1: National Publication of International Patent Application No. 2003-520279

Patent Literature 2: Japanese Patent Laid-Open No. 2004-197090

Patent Literature 3: Japanese Patent Laid-Open No. 2005-179679

SUMMARY OF INVENTION

Technical Problem

Accordingly, an object of the present invention is to provide a novel aqueous emulsion solution that is capable of solving the problems in the conventional technologies, and that becomes a coating film-forming component suitable for an inkjet printing system when the aqueous emulsion solution is contained in an ink. Specifically, the object of the present invention is to provide a novel aqueous emulsion solution that is capable of realizing, in the inkjet printing system, an aqueous pigment inkjet ink that has excellent high speed printability and ejection stability, that has an excellent redispersibility, particularly useful for the aqueous pigment inkjet ink using a pigment as a colorant, by which redispersibility an ink can easily be redispersed when the ink dries on a head or the like of a printer, and that can form printed matter having adhesiveness to various substrates. Further, another object of the present invention is to provide a simple production method by which the aqueous emulsion solution having the above-described excellent properties can easily and stably be obtained.

Solution to Problem

The above-described problems are solved by the present invention described below. That is to say, the present invention provides an aqueous emulsion solution comprising a polymer I and a polymer II mixed together therein, wherein the polymer I is an A-B block copolymer formed from 90 mass % or more of a methacrylate-based monomer and satisfying the following requirements (1) to (3):

(1) a polymer block A is substantially water-insoluble and has a number average molecular weight of 1000 to 10000 and a polydispersity index (weight average molecular weight/number average molecular weight) of 1.5 or less;

(2) a polymer block B is synthesized using, as a polymer block-forming component, a monomer comprising at least a methacrylic acid and has an acid value of 30 to 250 mgKOH/g; and (3) the A-B block copolymer comprising the polymer blocks has a number average molecular weight of 5000 to 20000, a content of the polymer block A of 5 to 60 mass % in the A-B block copolymer, and a polydispersity index (weight average molecular weight/number average molecular weight) of 1.6 or less, the A-B block copolymer being neutralized with an alkali, the polymer II is a polymer obtained by polymerizing a monomer comprising at least a hydrophobic addition polymerizable monomer and having a glass transition temperature of 70° C. or lower, and further a mass ratio of the polymer I and the polymer II is 5 to 80:95 to 20.

Preferable embodiments of the aqueous emulsion solution of the present invention include the followings: the aqueous emulsion solution wherein the polymer II is mixed together with the polymer I by adding a monomer for forming the polymer II to an aqueous solution obtained by dissolving the A-B block copolymer neutralized with an alkali into water and then subjecting the monomer to radical polymerization; the aqueous emulsion solution wherein the hydrophobic addition polymerizable monomer is at least any one selected from the group consisting of styrene, vinyl toluene, and a (meth)acrylate having an aliphatic group, an alicyclic group, or an aromatic group having a number of carbon atoms of 1 to 18; the aqueous emulsion solution wherein the polymer block A is synthesized using, as a polymer block-forming component, a monomer comprising a methacrylate having an aromatic group or an aliphatic group; and the aqueous emulsion solution having an average particle diameter of 20 to 300 nm obtained by light scattering measurement.

The present invention provides, as another embodiment, a coloring agent composition comprising at least: a dye and/or a pigment; water; a water soluble organic solvent; and further the aqueous emulsion solution comprising the polymer I and the polymer II mixed together therein.

The present invention provides, as another embodiment, a pigment-containing coloring agent composition comprising at least: a pigment; water; a water soluble organic solvent; a pigment dispersant; and further the aqueous emulsion solution comprising the polymer I and the polymer II mixed together therein. The preferable embodiments include the pigment dispersant has the same constitution as the A-B block copolymer used for the polymer I in the aqueous emulsion solution.

The present invention provides, as another embodiment, an aqueous inkjet ink comprising any one of the pigment-containing coloring agent compositions, wherein polymer components derived from the aqueous emulsion solution are 50 to 300 mass parts relative to 100 mass parts of the pigment in the coloring agent composition.

The present invention provides, as another embodiment, a method for producing an aqueous emulsion solution for obtaining any one the aqueous emulsion solutions, comprising an aqueous emulsion solution-obtaining step of obtaining an aqueous emulsion solution comprising the polymer I and the polymer II mixed together therein by adding an addition polymerizable monomer for forming the polymer II to an aqueous solution obtained by dissolving the A-B block copolymer neutralized with an alkali into water and then subjecting the monomer to radical polymerization.

The preferable embodiments of the method for producing an aqueous emulsion solution of the present invention include the method for producing an aqueous emulsion solution comprising an A-B block copolymer-producing step of producing the A-B block copolymer by subjecting a methacrylate-based monomer to living radical polymerization using at least an iodine compound as a polymerization initiation compound; and the method for producing an aqueous emulsion solution, wherein at least any one selected from phosphorus-based compounds being phosphorus halides, phosphite-based compounds, or phosphinate compounds; nitrogen-based compounds being imide-based compounds; oxygen-based compounds being phenol-based compounds; and hydrocarbons being diphenylmethane-based compounds or cyclopentadiene-based compounds is used as a catalyst in the step wherein the living radical polymerization is conducted.

The present invention provides, as another embodiment, a coloring agent composition comprising at least: a dye and/or a pigment; water; a water soluble organic solvent; and further an aqueous emulsion solution obtained by any one of the methods for producing an aqueous emulsion solution. The present invention provides, as another embodiment, an aqueous inkjet ink comprising the coloring agent composition as a constituent.

Advantageous Effects of Invention

By utilizing the aqueous emulsion solution of the present invention as a binder for forming a coating film of the ink, the adhesiveness of the printed matter to various substrates such as paper and films can be improved. Moreover, in the case where the above-described constitution is adopted, since a polymer dissolving in the ink does not exist and a resin exists as a particle in the ink, the viscosity of the ink is low, the ejection stability is improved, the ink is adaptable to high-speed printing, and further the redissolvability of the ink is imparted by which, even when the ink dries in the head or the like, the ink is redispersed with a cleaning liquid or the like, and therefore, according to the present invention, it becomes possible to provide an aqueous inkjet ink that has an excellent inkjet printability and that can stably prevent the occurrence of clogging of the head or the like. Moreover, according to the preferable embodiments of the present invention, by utilizing the aqueous emulsion solution of the present invention as a binder for forming a coating film of the pigment ink obtained by dispersing a pigment therein with a pigment dispersant and further by utilizing a particular A-B block copolymer that is one of the components that constitute the emulsion binder also as the pigment dispersant, the storage stability of the ink can remarkably be improved, and therefore the ink that is constituted in such a way as described above becomes a more excellent inkjet ink from which a further favorable result is obtained in addition to the afore-mentioned performance.

Moreover, the particular A-B block copolymer that is one of the components that constitutes the aqueous emulsion solution of the present invention has particular characters that are essential for achieving the above-described remarkable effects of the present invention, however the A-B block copolymer is simply obtained in a good yield by the production method that is specified in the present invention, that has resolved the problems in the conventional living radical polymerization methods, that is simple, that does not require special compounds, that does not require removal of catalysts, that makes it possible to conduct polymerization under a calm condition, and that does not require special facilities and so on, and therefore, according to the present invention, it is also possible to reduce production costs of products such as inkjet inks.

BRIEF DESCRIPTION OF DRAWING

FIG. 1 is a GPC chart for a polymer contained in an aqueous emulsion solution of Example 1 (GPC chart for Em-1).

DESCRIPTION OF EMBODIMENTS

Hereinafter, the present invention will be explained in detail giving preferable embodiments. The present inventors have conducted diligent studies in order to solve the problems in the conventional technologies to find that an A-B block copolymer in which one polymer block is water-insoluble (this polymer block is referred to as polymer block A for convenience in the present invention) and the other polymer block has a carboxy group (this polymer block is referred to as polymer block B for convenience in the present invention) is dissolved in water by neutralizing the A-B block copolymer with an alkali to prepare an aqueous solution, then another monomer containing at least a hydrophobic addition polymerizable monomer is subjected to emulsion polymerization using the neutralized A-B block copolymer (referred to as polymer I) as protective colloid to obtain a polymer (referred to as polymer II), thereby making it possible to prepare an aqueous emulsion solution containing the polymer I and the polymer II stably mixed together therein and the problems in the conventional technologies can be solved by using the aqueous emulsion solution, and, in this way, the present inventors have reached the present invention.

That is to say, the remarkable effect of the present invention can be obtained for the first time as a result of the finding that an aqueous emulsion solution containing the polymer I and the polymer II stably mixed together therein, the aqueous emulsion solution consisting of the following particular constitution can be realized. In the A-B block copolymer that is utilized as the polymer I that constitutes the present invention, the polymer block A is water-insoluble, and the polymer block B dissolves in water by being neutralized with an alkali because the polymer block B having a carboxy group is neutralized. For this reason, in an aqueous solution containing the polymer I, the polymer I takes a form in which the polymer block A exists as very fine particles because the polymer block A is water-insoluble and the polymer block B that is neutralized with an alkali dissolves in water. Further, when the monomer containing at least a hydrophobic addition polymerizable monomer is added and is subjected to (emulsion) polymerization in an aqueous solution containing the polymer I in which fine particles of the polymer block A as described above exist, the polymer II that is a polymerized product of the addition polymerizable monomer exists in such a state that the polymer II is incorporated in fine particles of the polymer block A. Therefore, the aqueous emulsion solution of the present invention becomes in such a state that the polymer II incorporated in the fine particles made of the polymer block A in the polymer I is mixed together with the polymer I, and, further, the fine particles become extremely stable in water because the polymer block B in the polymer I dissolves in water. In this way, the aqueous resin emulsion solution of the present invention has characters that are totally different from those of conventional aqueous resin emulsion solutions. For example, the A-B block copolymer that constitutes the polymer I used for the protective colloid as described above is water-insoluble and exists as fine particles in which the polymer II is incorporated and mixed together with the polymer I, and therefore the reduction of the viscosity of the aqueous emulsion solution can be achieved.

As described above, a polymer component that dissolves in water does not exist in the aqueous emulsion solution of the present invention, which is different from conventional water soluble polymers, and therefore, in the case where the aqueous emulsion solution of the present invention is used as a constituent of an inkjet ink, there occurs no problem such as change in the viscosity and deficiency in the ejection stability as described previously. On the other hand, since the polymer block B in the A-B block copolymer that is utilized as the polymer I has a carboxy group, the polymer block B has a high solubility to water, easily dissolves in another liquid medium such as, for example, an aqueous alkaline solution even when the ink dries in the head (namely, has good redissolvability), and can make the ink excellent in redissolvability. Further, since the polymer II is formed, as described above, by (emulsion) polymerization in the particles of the addition polymerizable monomer under the presence of the fine particles of the polymer block A, the molecular weight of the polymer II becomes very large. Therefore, the aqueous emulsion solution of the present invention, when used as a coating film-forming component for inkjet inks or the like, becomes a useful material that can exhibit a remarkable effect that a favorable coating film that is tough and has a high adhesiveness can be obtained. The aqueous emulsion solution of the present invention has the above-described particular characters, and therefore it becomes possible to solve the problems in the conventional technologies all at once particularly by using the aqueous emulsion solution for inkjet inks.

Living radical polymerization is suitable as a method for obtaining the A-B block copolymer that is utilized as the polymer I that constitutes the aqueous emulsion solution of the present invention, however there are various methods in the living radical polymerization. For example, the methods include an NMP method using a nitroxide, an atom transfer radical polymerization method utilizing a metal complex such as copper or ruthenium complex and a halogenated compound, a reversible addition-fragmentation chain transfer polymerization using a sulfur compound or the like such as dithiocarbamate, and other methods. However, every method has its own problem as described below. That is to say, a high temperature is necessary for the NMP method, and living radical polymerization is not favorably applicable to methacrylate-based monomers. Moreover, the atom transfer radical polymerization uses a metal complex, the metal complex uses an amine compound as a ligand, and therefore a monomer containing a carboxy group cannot be polymerized as it is. Furthermore, the reversible addition-fragmentation chain transfer polymerization uses a sulfur compound and therefore has a problem of offensive odor, or other problems.

In the present invention, it is preferable to produce the A-B block copolymer that characterizes the present invention through living radical polymerization in which, in conventional radical polymerization, an iodine compound is used as a polymerization initiation compound and an organic compound having an active phosphorus, nitrogen, oxygen, or carbon atom is used as a catalyst as necessary. By producing the A-B block copolymer in such a way as described above, the A-B block copolymer having a narrow molecular weight distribution (hereinafter, abbreviated as PDI), namely having a uniform molecular weight, the A-B block copolymer specified in the present invention can easily be obtained. Since the A-B block copolymer that constitutes the present invention is such a block copolymer having a narrow molecular weight distribution, when the A-B block copolymer is neutralized with an alkali to prepare the polymer I, the characteristics thereof become uniform because neither a polymer molecule that easily dissolves in water nor a polymer molecule that is hard to dissolve in water exists. As a result that the characteristics of the polymer I are uniform as described above, when radical polymerization is conducted in the aqueous solution containing the polymer I adding the addition polymerizable monomer to allow the polymer II to be mixed together with the polymer I, the aqueous emulsion solution having a character by which the stability can outstandingly be maintained is obtained. Further, the performance that is most suitable for ejection properties in the inkjet printing method can be obtained by applying such an aqueous emulsion solution to inkjet inks.

Moreover, in a pigment dispersion liquid, a pigment dispersant is used in dispersing the pigment, however the A-B block copolymer that is utilized for the polymer I that constitutes the aqueous emulsion solution of the present invention can also be used as the dispersant. When the A-B block copolymer is used as the pigment dispersant in the pigment dispersion liquid or the like containing the aqueous emulsion solution of the present invention, the following effects are obtained. That is to say, in this case, since the polymer I used for emulsifying the aqueous emulsion solution of the present invention and the polymer used as the pigment dispersant is the same, aggregation, precipitation, and separation that can occur between different polymers, dispersion destruction and aggregation between dispersed pigments, and phase separation and whitening when a coating film is formed after printing cannot occur even when the aqueous emulsion solution is added to the pigment dispersion liquid obtained by dispersing the pigment with the dispersant. As a result thereof, favorable pigment dispersion liquid, ink, and images can be given.

Next, the present invention will be explained in detail giving favorable embodiments of the aqueous emulsion solution of the present invention.

The present invention relates to an aqueous emulsion solution containing a polymer I and a polymer II mixed together therein, and the polymer I and the polymer II each have the following properties. In the first place, the polymer I is an A-B block copolymer formed from 90 mass % or more of a methacrylate-based monomer and having particular constitution satisfying the following requirements (1) to (3), the A-B block copolymer being neutralized with an alkali. As the requirement (1), it is required that a polymer block A in the A-B block copolymer be substantially water-insoluble and have a number average molecular weight of 1000 to 10000 and a polydispersity index (weight average molecular weight/number average molecular weight) showing the molecular weight distribution of 1.5 or less. Further, as the requirement (2), it is required that a polymer block B in the A-B block copolymer contain at least a methacrylic acid as a constituent and have an acid value of 30 to 250 mgKOH/g. The polymer block B is in a state that the carboxy group of methacrylic acid in the polymer block B is neutralized by the neutralization with an alkali and the polymer block B dissolves in water. Furthermore, as the requirement (3), it is required that the A-B block copolymer have a number average molecular weight of 5000 to 20000, a content of the polymer block A of 5 to 60 mass % in the A-B block copolymer, and a polydispersity index (weight average molecular weight/number average molecular weight) of 1.6 or less.

Furthermore, it is required that the polymer II being another component that constitutes the aqueous emulsion solution of the present invention be a polymer obtained by polymerizing an addition polymerizable monomer containing at least a hydrophobic addition polymerizable monomer and having a glass transition temperature of 70° C. or lower, and it is also required that a mass ratio of the polymer I to the polymer II be 5 to 80:95 to 20.

In the first place, the polymer I will be explained. The polymer I is a polymer in which the particular A-B block copolymer is neutralized with an alkali and contained in an aqueous solution, is also a polymer component for emulsifying and finely dispersing the polymer II that is allowed to be present with the polymer I in the aqueous emulsion solution of the present invention, and shows a function as, what is called, protective colloid. The polymer II here is a polymer component obtained by polymerizing a monomer containing at least a hydrophobic addition polymerizable monomer, having a high molecular weight, being water-insoluble, and having a function of forming a tough film. For the purpose of stably dispersing and emulsifying such a polymer II in water, surface active agents, emulsifying agents, and styrene/maleic acid-based polymers and styrene/acrylic acid-based polymers having a random structure have been used in the conventional technologies. Also in this case, the polymer II can stably be dispersed and emulsified by the same action as described above, however according to the studies conducted by the present inventors, there has been a problem as described below. That is to say, any of the materials that have conventionally been used for dispersing and emulsifying the polymer II is a water-soluble compound or polymer that is dissolved, and therefore has had a problem of lacking in the performance of ejection properties or the like caused by the occurrence of bubbles or the increase in viscosity particularly when utilized as an inkjet ink for inkjet printing.

A major characteristic of the polymer I that constitutes the aqueous emulsion solution of the present invention is that it is essential that the A-B block copolymer formed from 90 mass % or more of a methacrylate-based monomer and having a particular structure be neutralized, and the following novel properties that have never been achieved before is obtained by the constitution. The A-B block copolymer that characterizes the present invention consists of the polymer block A and the polymer block B, the polymer block A is substantially water-insoluble, and the polymer block B has a carboxy group and therefore dissolves in water when the carboxy group is neutralized with an alkali. For this reason, when the A-B block copolymer used in the present invention is added to water, the polymer block A precipitates in water because the polymer block A is substantially water-insoluble, however the polymer block B dissolves in water by neutralized with an alkali. Therefore, the polymer block A that is water-insoluble becomes in such a state that the polymer block A is dispersed in the form of fine particles by the polymer block B. As a result thereof, the polymer I in the aqueous emulsion solution of the present invention is dispersed in the form of extremely small particles (10 nm or less) in water. Since the polymer I has such a property, when the aqueous emulsion solution of the present invention is used as an ink or the like, the ink hardly allows the viscosity change or the occurrence of bubbles to cause, the viscosity change or the occurrence of bubbles observed when the conventional polymer dispersion obtained by dispersing and emulsifying a water-insoluble polymer using a water-soluble surface active agent, emulsifying agent, or polymer.

As described above, in the aqueous emulsion solution of the present invention, the water-insoluble polymer II is mixed together with the polymer block A that constitutes the polymer I to become in the form of fine particles within the particles of the polymer block A in the polymer I in water. On the other hand, the polymer block B that constitutes the polymer I dissolves in water, which makes the particle made of the particle of the polymer block A and the polymer II incorporated in the particle of the polymer block A in such a state that the particle is stably dispersed and emulsified in water.

The A-B block copolymer that characterizes the present invention, that is utilized as the polymer I by being neutralized with an alkali, and that is formed from 90 mass % or more of a methacrylate-based monomer satisfies all of the following requirements (1) to (3). These requirements will be explained below.
(1) The polymer block A is substantially water-insoluble and has a number average molecular weight of 1000 to 10000 and a polydispersity index (weight average molecular weight/number average molecular weight, hereinafter abbreviated as PDI) showing the molecular weight distribution of 1.5 or less.
(2) The polymer block B contains at least a methacrylic acid as a constituent and has an acid value of 30 to 250 mgKOH/g.
(3) The A-B block copolymer has a number average molecular weight of 5000 to 20000, a content of the polymer block A of 5 to 60 mass % in the A-B block copolymer, and a PDI as a whole of 1.6 or less.

In the present invention, the A-B block copolymer formed from 90 mass % or more of a methacrylate-based monomer is utilized. That is to say, styrene-based monomers and acrylate-based monomers in addition to the methacrylate-based monomers can also be used for the A-B block copolymer used in the present invention, however it is preferable to constitute all of the monomers that form the A-B block copolymer from methacrylate-based monomers. It is known that the methacrylate-based monomers are most suitable kinds of monomers for the polymerization method that is used in the present invention, and moreover the methacrylate-based monomers can have various ranges of glass transition temperatures, functional groups, and solubility, and can have performance as a hard material or a soft material. That is to say, when the styrene-based monomer is used as the main monomer, it is difficult to obtain the molecular weight distribution, the molecular weight, and so on that are specified in the present invention by the polymerization method that is utilized in the present invention, and when the acryl-based monomer is used as the main monomer, the obtained A-B block polymer is sometimes too soft. From the above-described reasons, emulsification and dispersion of the polymer is made more favorable in the aqueous emulsion solution of the present invention by using the A-B block copolymer obtained using the methacrylate-based monomer as the main monomer.

As mentioned previously, the polymer block A that constitutes the A-B block copolymer is a substantially water-insoluble polymer block, and the polymer block B is a polymer block that is synthesized using at least methacrylic acid as a polymer block-forming component and that dissolves in water by the methacrylic acid-derived carboxy groups being neutralized with an alkali. Hereinafter, these polymer blocks will be explained in detail.

The polymer block A is synthesized using a publicly known methacrylate as the main polymer block-forming component and shows a character that is substantially water-insoluble. The methacrylates that can be used for the synthesis of the polymer block A include the followings. Examples thereof include:

methacrylate esters of aliphatic alcohols such as methyl methacrylate, ethyl methacrylate, n-propyl methacrylate, 2-propyl methacrylate, n-butyl methacrylate, isobutyl methacrylate, t-butyl methacrylate, n-hexyl methacrylate, n-octyl methacrylate, 2-ethylhexyl methacrylate, decyl methacrylate, isodecyl methacrylate, dodecyl methacrylate, and octadecyl methacrylate;

methacrylate esters of aliphatic alcohols or alkoxy alkanols thereof such as cyclohexyl methacrylate, 3-methylcyclohexyl methacrylate, 3-ethylcyclohexyl methacrylate, 3,3,5-trimethylcyclohexyl methacrylate, 4-t-butylcyclohexyl methacrylate, tricyclodecyl methacrylate, dicyclopentenyloxyethyl methacrylate, isobornyl methacrylate, and adamantyl methacrylate; and aromatic group-containing methacrylate esters such as phenyl methacrylate, naphthyl methacrylate, phenoxyethyl methacrylate, benzyl methacrylate, and para-cumyl phenoxyethyl methacrylate. In addition to these, the examples of the aromatic group-containing methacrylate also include methacrylate esters such as 2-(4-benzoxy-3-hydrophenoxy) ethyl methacrylate, and 2-(2'-hydroxy-5-methacryloyloxy ethylphenyl)-2H-benzotriazole each having ultraviolet ray-absorbing ability. When the aqueous emulsion solution of the present invention is used as a material of an ink, it is preferable to use the A-B block copolymer obtained using such a monomer having ultraviolet ray-absorbing ability as these monomers because it is made possible to allow the printed coating film that is formed to have ultraviolet ray-absorbing ability and the light fastness of dyes or pigments in the ink can be improved.

Further, examples of the methacrylate that can be used for the synthesis of the polymer block A include:

glycol-based methacrylate esters such as 2-hydroxyethyl methacrylate, 2-hydroxypropyl methacrylate, 4-hydroxybutyl methacrylate, methoxyethyl methacrylate, ethoxyethyl methacrylate, butoxyethyl methacrylate, methoxyethoxyethyl methacrylate, poly(n=2 or more)ethylene glycol monomethacrylates, methoxy poly(n=2 or more)ethylene glycol methacrylate, and glyceryl methacrylate;

amino group- or quaternary ammonium salt-containing methacrylates such as N,N-dimethylaminoethyl methacrylate, N,N-diehtylaminoethyl methacrylate, N-t-butylaminoethyl methacrylate, trimethylaminoethyl chloride methacrylate, tetramethyl piperidinyl methacrylate, and pentamethyl piperidinyl methacrylate;

cyclic ether group-containing methacrylates such as tetrahydrofurfuryl methacrylate;

methacrylate esters of halogen atom-containing alcohols such as 2,2,2-trifluoroethyl methacrylate, 1-chloro-2-hydroxypropyl methacrylate, and heptadecafluorodecyl methacrylate; and methacrylate esters of silicon atom-containing alcohols such as trimethylsilyl methacrylate, (poly)dimethyl silicone methacrylate, and so on.

In the polymer I that constitutes the aqueous emulsion solution of the present invention, the A-B block copolymer having a particular structure is neutralized with an alkali to allow the polymer block B to be water-soluble, however the polymer block A is substantially water-insoluble. Therefore, the methacrylate having a carboxy group or a phosphate group may be used as the component for forming the polymer block A to such an extent that the polymer block A does not become substantially water-soluble when the polymer block B is neutralized with an alkali. Examples of the monomer having a carboxy group used for forming the polymer block A include: methacrylates obtained by reacting methacrylic acid or 2-hydroxyethyl methacrylate with a dibasic acid such as succinic acid, maleic acid, or phthalic acid; and methacryloyloxyethyl phosphate; and so on. Moreover, for the purpose of making the polymer block A substantially water-insoluble when neutralized, the polymer block A may be designed so as to have an acid value of preferably about 0 to about 30 mgKOH/g, more preferably about 0 to about 10 mgKOH/g although the acid value is not limited to such ranges when the other monomer components are taken into consideration. In addition, the acid value is defined as the number of mg of potassium hydroxide needed for neutralizing 1 g of a resin, and can be measured by titrating the resin dissolved in an organic solvent (for example, toluene/ethanol=70/30 expressed as a mass ratio) using 0.1 N aqueous potassium hydroxide as a titrant and phenolphthalein as an indicator. The values measured in such a manner as described above are used as the acid values in the present invention.

Since the polymer block B in the A-B block copolymer used in the present invention has a carboxy group, it is preferable that the polymer block A does not contain a functional group that reacts with the carboxy group such as, for example, a glycidyl group, an isocyanate group, and an oxetanyl group. The reason is because there is a possibility that these functional groups react with the carboxy group resulting in gelation.

Moreover, when the polymer block A is synthesized, the synthesis is conducted by appropriately selecting the monomers from the above-listed monomers and adjusting the kinds and compositional amounts thereof so that the polymer block A becomes substantially water-insoluble.

As mentioned previously, the polymer block A becomes in the form of fine particles and includes the polymer II to be mixed together with the polymer A. According to the studies conducted by the present inventors, it is more preferable that at least the methacrylate having an aromatic group or an alicyclic group among the above-listed monomers is used as the constituent in synthesizing the polymer block A for the purpose of allowing the polymer block A to exhibit a high hydrophobicity. That is to say, it is considered that the aromatic ring enhances the affinity to the polymer II due to the benzene ring, the aliphatic ring enhances the affinity to the polymer II due to the high hydrophobicity and the hardness, and therefore the aromatic ring and aliphatic ring are suitable for the function of stably and finely dispersing the polymer II resulting in favorable results. According to the studies conducted by the present inventors, it is preferable that the monomers are formulated so that the use amount thereof accounts for 50 mass % or more of the polymer block A. Suitable monomers in synthesizing the polymer block A include the methacrylate having an aromatic group or an alicyclic group, however more preferably, benzyl methacrylate or cyclohexyl methacrylate is used. It is preferable to use these monomers as the constituent because these monomers have a high versatility, and further the glass transition temperature (hereinafter, sometimes referred to as Tg) of the homopolymer thereof is not so high and therefore the glass transition temperature of the polymer block A does not rise too much, although this cannot be said as a rule because the situation is different depending on the ratios of the other constituent monomers.

The polymer block A synthesized from the above-described monomers is required to be substantially water-insoluble, and to have a number average molecular weight of 1000 to 10000 and a PDI of 1.5 or less. The number average molecular weight in the present invention means the number average molecular weight in terms of polystyrene obtained by the measurement by the gel permeation chromatography (hereinafter, abbreviated as GPC), and the same applies hereinafter including Examples. The present invention specifies that the number average molecular weight is 1000 to 10000 as the polymer block A. The reason is because when the number average molecular weight is less than 1000, the molecular weight is too small and the polymer block A dissolves in water, the polymer block A cannot form favorable particles formed by incorporating the polymer II in the particles, and therefore the polymer block A cannot impart sufficient dispersion and emulsification to the polymer II. On the other hand, when the number average molecular weight exceeds 10000, the particle size becomes large by the polymer block A alone at the time when the A-B block copolymer is dispersed into water, and there is a possibility that the particles cannot sufficiently incorporate the polymer II therein. The number average molecular weight of the polymer block A is more preferably 3000 to 8000.

The PDI of the polymer block A is required to be 1.5 or less. The PDI represents the distribution of the molecular weight, and when the PDI is larger than 1.5, there is a possibility that a large amount of the polymer bocks the molecular weight of which is out of the above-described range of the number average molecular weight is contained. The PDI of the polymer block A may preferably be 1.3 or less.

Next, the polymer block B in the A-B block copolymer used in the present invention will be explained. The polymer block B functions, in the A-B block copolymer, as a polymer block that dissolves in water, and the polymer block B contributes to the dispersion and emulsification stability by enhancing the affinity to water at the time when the polymer block A becomes in a form of fine particles or when the polymer block A becomes in a form of emulsion particles while incorporating the polymer II. In order to obtain the water solubility, a carboxy group is essential for the polymer block B, and methacrylic acid is essential as a component for forming the polymer block B. The ester type methacrylates having a carboxy group may be used, however there is a possibility that, in the ester type methacrylates, the esters are hydrolyzed to impair the affinity to water. Contrary to this, when the methacrylic acid is used as a constituent, the carboxy group contained in the methacrylic acid is neutralized with an alkali and ionized to surely become water-soluble. The amount of the methacrylic acid is specified by the acid value and, in the present invention, the acid value is set to 30 to 250 mgKOH/g. When the acid value is less than 30 mgKOH/g, a sufficient water solubility is not obtained, and when the acid value is larger than 250 mgKOH/g, the affinity to water is so large that the viscosity becomes high when the polymer block B dissolves in water, and moreover there arises a possibility that a problem of water fastness occurs when the A-B block copolymer changes into a form of a coating film. The acid value is more preferably 50 to 200 mgKOH/g. In the present invention, it is preferable to adjust the amounts of the other methacrylate-based monomers as constituents so that the acid value originated from the methacrylic acid in the polymer block B fall within the above-described range. The monomer used in adjusting the monomers is not limited, and one or more of the above-listed methacrylate-based monomers may be used.

The molecular weight of the polymer block B is not particularly limited, and, as will be mentioned later, the molecular weight of the polymer block B is determined as the number average molecular weight obtained by subtracting the number average molecular weight of the polymer block A from the number average molecular weight of the A-B block copolymer as a whole. Accordingly, the number average molecular weight of the polymer block B may be in a range that is consistent with the range determined from a number average molecular weight of 5000 to 20000 that is specified in the A-B block copolymer and a number average molecular weight of 1000 to 10000 that is specified in the polymer block A. The molecular weight of the polymer block B may preferably be from 3000 to 15000, more preferably 4000 to 10000.

The A-B block copolymer used as the polymer I that constitutes the aqueous emulsion solution of the present invention consists of the above-described polymer block A and polymer block B, and has a number average molecular weight of 5000 to 20000, a content of the polymer block A of 5 to 60 mass % in the A-B block copolymer, and further a PDI as a whole of 1.6 or less. The reason is as follows with respect to the number average molecular weight firstly: in the case where the number average molecular weight is less than 5000, it sometimes occurs that when an ink is made from the aqueous emulsion solution containing the polymer I and is printed, the performance as a coating film is not favorable due to poor strength because the molecular weight as a polymer is small; and, on the other hand, in the case where the number average molecular weight exceeds 20000, there is a possibility that the viscosity of the ink becomes high because the molecular weight is too large or that dispersion and emulsification cannot favorably be performed because the molecule is too large and the number of molecules becomes small from the standpoint of blending, resulting in shortage in the amount of the A-B block copolymer that contributes to dispersion and emulsification. More preferable number average molecular weight is from 6000 to 15000.

Further, the ratio of the polymer block A in the A-B block copolymer is specified as 5 to 60 mass % in the present invention, and the reason is because the polymer block A is used for forming particles of the A-B block copolymer and, as will be mentioned below, sufficient particle formation and stability becomes necessary. That is to say, the reason is because when the ratio of the polymer block A in the A-B block copolymer is less than 5 mass %, the amount of the polymer block A is deficient, and therefore the polymer block A cannot sufficiently incorporate the polymer II, and, on the other hand, when the amount of the polymer block A in the A-B block copolymer exceeds 60 mass %, the amount of the polymer block B becomes relatively small and it sometimes occurs that a sufficient stability of the emulsion particles cannot be maintained. Therefore, it is more preferable that 20 to 50 mass % of the polymer block A may be contained from the standpoint of maintaining a higher stability.

Moreover, the PDI of the A-B block copolymer as a whole is 1.6 or less, and the reason is because, as described previously, the PDI within the range is necessary for maintaining the specified molecular weight range to the utmost and more stable emulsion particles can be formed by the molecular weights being uniformly distributed. The PDI of the A-B block copolymer as a whole is more preferably 1.5 or less.

In the aqueous emulsion solution of the present invention, the A-B block copolymer having the above-described particular structure is neutralized with an alkali to use as the polymer I, and it is preferable to obtain the A-B block copolymer by the following polymerization method. As mentioned previously, the A-B block copolymer used in the present invention is required to have the molecular weight as the polymer block A, as the polymer block B, and as the polymer as a whole in a particular range and to have a uniform molecular weight distribution, and it is preferable to use living radical polymerization method as a method for obtaining such a copolymer. As mentioned previously, the following methods are preferable as the living radical polymerization method for obtaining the polymer I of the present invention. Specifically, the living radical polymerization used in the present invention includes a polymerization step of subjecting a monomer component containing a methacrylate-based monomer as listed above to living radical polymerization under the presence of a polymerization initiation compound and a catalyst, in which the polymerization initiation compound that is used is at least any one of iodine and an iodine compound and the catalyst is at least one compound selected from the group consisting of phosphorus halides, phosphite-based compounds, phosphinate compounds, imide-based compounds, phenol-based compounds, diphenylmethane-based compounds, and cyclopentadiene-based compounds.

Now, various methods have been invented as the living radical polymerization. Examples thereof include a nitroxide mediated polymerization method (NMP method) utilizing dissociation and bonding of an amine oxide radical, an atom transfer radical polymerization method (ATRP method) conducting polymerization using a heavy metal such as copper, ruthenium, nickel, or iron, also using a ligand that forms a complex with these heavy metals, and further using a halogen compound as the initiation compound, a reversible addition-fragmentation chain transfer method (RAFT method) or a MADIX method (Macromolecular Design via Interchange of Xanthate) conducting polymerization using a dithiocarboxylic acid ester or xanthate compound as the initiation compound and also using an addition polymerizable monomer as the radical initiator, a degenerative transfer method (DT method) using a heavy metal such as organotellurium, organobismuth, organoantimony, an antimony halide, organogermanium, or a germanium halide, and so on. These methods uses the polymerization initiation compound and can also be applicable to the present invention.

However, the above methods have a problem for simply and stably obtaining the A-B block copolymer that characterizes the present invention. In the NMP method for example, an amine oxide such as a tetramethylpiperdine oxide radical is used, however it is necessary to conduct polymerization under the high temperature condition of 100° C. or higher, and there is also a problem that the polymerization does not progress when the methacrylate-based monomers are used.

In the ATRP method, it is necessary to use a heavy metal, and since the ATRP method is a polymerization method that is accompanied by the oxidation-reduction reaction, it is necessary to remove oxygen, and in the method for conducting polymerization in which a complex is formed using an amine compound as a ligand, it is difficult to polymerize an addition polymerizable monomer having an acid group as it is because the formation of the complex is inhibited when an acidic substance exists in the polymerization system. It is necessary to polymerize a monomer the acid group of which is protected by a protective group and to detach the protective group after polymerization, however such polymerization is complicated and therefore it is not easy to introduce an acid group in a polymer block.

In the RAFT method and MADIX method, first of all, a special compound such as a dithiocarboxylic acid ester or a xanthate compound is necessary, and since these compounds are sulfur compounds, unpleasant odor of sulfur is liable to be left in the obtained polymer, and it sometimes occurs that the obtained polymer is colored. Therefore, it is necessary to remove the odor or coloration from the obtained polymer. It sometimes occurs that polymerization of methacrylate-based monomers gives poor results. Moreover, there is a possibility that sulfur esters such as the dithiocarboxylic acid ester and the xanthate compound are decomposed by an amino group, and it sometimes occurs that a polymer having a low molecular weight is produced or sulfurous odor is generated.

Furthermore in the DT method, it is necessary to use a heavy metal as in the case of the ATRP method. Therefore, there is a problem that it is necessary to remove the heavy metal from the obtained polymer, and there is also a problem that the waste water containing the generated heavy metal should be purified.

Facing the situation as described above, in the aforementioned polymerization method for obtaining the A-B block copolymer conducted in the method for producing an aqueous emulsion solution of the present invention, the use of the heavy metal compound is not essential, the purification of the polymer is not essential, it is not necessary to synthesize a special compound, and the A-B block copolymer can be produced by only using relatively low-cost materials sold on the market, and therefore the polymerization method for obtaining the A-B block copolymer conducted in the method for producing an aqueous emulsion solution of the present invention is extremely useful. Furthermore, the polymerization condition is calm in this method, by which polymerization can be conducted under the same condition as that of the conventional radical polymerization method, and what is specially mentioned in this method is that monomers having a carboxy group or a phosphorus group can be subjected to living radical polymerization as they are.

The method for producing the A-B block copolymer used in the present invention, as mentioned previously, includes a polymerization step of subjecting a monomer component containing a methacrylate-based monomer to living radical polymerization under the presence of the polymerization initiation compound and the catalyst (polymerization step), in which at least any one of iodine and an iodine compound is used as the polymerization initiation compound. In the living radical polymerization method, various functional groups can be used as will be mentioned later.

In the polymerization step, at least any one of iodine and an iodine compound is used as the polymerization initiation compound, and a monomer component containing a methacrylate-based monomer is polymerized by living radical polymerization, and the reaction during polymerization progresses as follows. First of all, when light or heat is given to the iodine or iodine compound used as the polymerization initiation compound, the iodine or iodine compound dissociates to produce an iodine radical. And the monomer is inserted in the polymer in a state where the iodine radical is isolated, immediately thereafter the iodine radical is bound again to the radical at the polymer end to stabilize, and the polymerization reaction proceeds while preventing the termination reaction.

Specific examples of the iodine compound used in the living polymerization include: alkyl iodides such as 2-iodo-1-phenylethane, 1-iodo-1-phenylethane; cyano group-containing iodides such as 2-cyano-2-iodopropane, 2-cyano-2-iodobutane, 1-cyano-1-iodocyclohexane, 2-cyano-2-iodo-2,4-dimethylpentane, and 2-cyano-2-iodo-4-methoxy-2,4-dimethylpentane; and so on.

As these iodine compounds, commercially available products may be used as they are, however these iodine compounds prepared by a conventionally known method can also be used. For example, an iodine compound can be obtained by reacting an azo compound such as azoisobutyronitrile with iodine. Moreover, an iodine compound can also be obtained by reacting an iodide salt such as quaternary ammonium iodide or sodium iodide with an organic halogen compound obtained by substituting the iodine in the iodine compound with a halogen atom such as bromine or chlorine to conduct halogen exchange.

In the polymerization step, the catalyst that can abstract iodine in the polymerization initiation compound may further be used together with the polymerization initiation compound. As the catalyst, it is preferable to use a phosphorus-based compound such as a phosphorus halide, a phosphite-based compound, or a phosphinate compound; a nitrogen-based compound such as an imide-based compound; an oxygen-based compound such as a phenol-based compound; or a hydrocarbon-based compound such as a diphenylmethane-based compound or a cyclopentadiene-based compound. In addition, these catalysts may be used alone or in combination of two or more.

Specific examples of the phosphorus-based compound include phosphorus triiodide, diethyl phosphite, dibutyl phosphite, ethoxyphenyl phosphinate, phenylphenoxy phosphinate, and so on. Specific examples of the nitrogen-based compound include succinimide, 2,2-dimethylsuccinimide, maleimide, phthalimide, N-iodo succinimide, hydantoin, and so on. Specific examples of the oxygen-based compound include phenol, hydroquinone, methoxyhydroquinone, t-butyl phenol, catechol, di-t-butyl hydroxytoluene, and so on. Specific examples of the hydrocarbon-based compound include cyclohexadiene, diphenylmethane, and so on. It is preferable that the use amount (number of moles) of the catalyst is less than the use amount (number of moles) of the polymerization initiation compound. It is not preferable that the use amount (number of moles) of the catalyst is too large because it sometimes occurs that the polymerization is controlled more than necessary and is hard to progress.

Moreover, it is preferable that the temperature during living radical polymerization (polymerization temperature) is set to from 30 to 100° C. It is not preferable that the polymerization temperature is too high because it sometimes occurs that iodine at the polymerization terminal decomposes to make the terminal not stable and therefore the polymerization does not progress as living radical polymerization. Moreover, in this polymerization method, it is preferable that iodine is bonded to the terminal, radicals are generated by dissociating the iodine as radicals, and the terminal is stable. Here, when the monomer is an acrylate or vinyl-based monomer, the terminal is a secondary iodide, which is relatively stable and does not detached as an iodine radical, and therefore there is a possibility that the polymerization does not progress or the molecular weight distribution becomes broad. Against the problem, it is possible to dissociate the iodine by raising the temperature, however it is preferable to conduct polymerization mildly in the above-described temperature range from the standpoint of environment and energy. Accordingly, a tertiary iodide that is easy to generate radicals and that is relatively stable is more preferable, and methacrylate-based monomers are suitable in the living radical polymerization that is used in the present invention.

Moreover, the polymerization initiator that is capable of generating a radical is usually added in the polymerization step. As the polymerization initiator, conventionally known azo-based initiators and peroxide-based initiators are used. In addition, it is preferable to use a polymerization initiator with which a radical is sufficiently generated within the above-described range of the polymerization temperature. Specifically, it is preferable to use azo-based initiators such as 2,2'-azobis(4-methoxy-2,4-dimethylvaleronitrile). It is preferable that the use amount of the polymerization initiator is set to from 0.001 to 0.1 times larger than the number of moles of the monomers, more preferably 0.002 to 0.05 times larger. When the use amount of the polymerization initiator is too small, it sometimes occurs that the polymerization reaction does not sufficiently progress. On the other hand, when the use amount of the polymerization initiator is too large, it sometimes occurs that the usual radical polymerization reaction other than the living radical polymerization reaction progresses as the secondary reaction.

The living radical polymerization may be a bulk polymerization in which an organic solvent is not used, however it is preferable that the living radical polymerization is conducted by solution polymerization using an organic solvent. It is preferable that the organic solvent is capable of dissolving the polymerization initiation compounds, the catalysts, the monomer components, and the polymerization initiators.

As the specific examples of the organic solvent, the organic solvents listed below can be used. That is to say, hydrocarbon-based solvents such as hexane, octane, decane, isodecane, cyclohexane, methylcyclohexane, toluene, xylene, and ethylbenzene; alcohol-based solvents such as methanol, ethanol, propanol, isopropanol, butanol, isobutanol, hexanol, benzyl alcohol, and cyclohexanol; glycol-based solvents such as ethylene glycol, diethylene glycol, propylene glycol, dipropylene glycol, methyl cellosolve, ethyl cellosolve, butyl cellosolve, propylene glycol monomethyl ether, propylene glycol monoethyl ether, propylene glycol propyl ether, diglyme, triglyme, tetraglyme, dipropylene glycol dimethyl ether, butyl carbitol, butyltriethylene glycol, methyldipropylene glycol, methyl cellosolve acetate, propylene glycol monomethyl ether acetate, dipropylene glycol butyl ether acetate, and diethylene glycol monobutyl ether acetate; ether-based solvents such as diethyl ether, dipropyl ether, methylcyclopropyl ether, tetrahydrofuran, dioxane, and anisole; ketone-based solvents such as methyl ethyl ketone, diethyl ketone, methyl isobutyl ketone, cyclohexanone, isophorone, and acetophenone; ester-based solvents such as methyl acetate, ethyl acetate, butyl acetate, propyl acetate, methyl butyrate, ethyl butyrate, caprolactone, methyl lactate, ethyl lactate, dimethyl succinate, dimethyl adipate, and dimethyl glutarate; halogenated solvents such as chloroform, and dichloroethane; amide-based solvents such as dimethylformamide, dimethylacetoamide, pyrrolidone, N-methylpyrrolidone, and caprolactam, and in addition to these, dimethyl sulfoxide, sulfolane, tetramethylurea, ethylene carbonate, propylene carbonate, dimethyl carbonate, and so on. In addition, these organic solvents can be used alone or in combination of two or more.

Moreover, the organic solvent that has been used for the polymerization can be used as it is for the solvent of the polymer I, however the copolymer can be taken out from the solution and used as a solid form as necessary. The method for taking out the synthesized copolymer is not particularly limited, and only the copolymer can be taken out to obtain the copolymer as the solid body thereof by, for example, precipitating the copolymer in a poor solvent and then filtering and drying the precipitated copolymer, or by drying the solution of the copolymer. An aqueous alkaline solution is added to the solution of the obtained A-B block copolymer to neutralize and solubilize the carboxy groups in the A-B block copolymer, thereby making it possible to prepare the solution of the polymer I. Moreover, the A-B block copolymer, when taken out as a solid, may be used by adding the A-B block copolymer to a water medium, neutralizing the carboxy groups with an alkali to dissolve and disperse the A-B block copolymer in water.

In the case where the solution polymerization is conducted, it is preferable that the solid concentration (monomer concentration) in the polymerization liquid is set to from 5 to 80 mass %, more preferably 20 to 60 mass %. It is not preferable that the solid concentration in the polymerization liquid is less than 5 mass % because it sometimes occurs that the monomer concentration is too low to complete the polymerization. On the other hand, when the solid concentration in the polymerization liquid exceeds 80 mass % or when the polymerization is bulk polymerization, the viscosity of the polymerization liquid becomes too high, which makes stirring difficult, and therefore the conversion tends to be lowered. It is preferable to conduct living radical polymerization until the monomer is consumed. Specifically, it is preferable to set the polymerization time to be 0.5 to 48 hours, and it is more preferable to set the polymerization time to substantially 1 to 24 hours. Moreover, the polymerization atmosphere is not particularly limited, and may be an atmosphere where oxygen exists within the normal range or an atmosphere under a nitrogen stream. Further, with respect to materials (such as monomers) used for polymerization, materials from which impurities are removed by distillation, activated carbon treatment, alumina treatment, or the like may be used, or commercially available products may be used as they are. Furthermore, polymerization may be conducted under a light shielded condition, or polymerization may be conducted in a transparent container such as a glass container.

As described previously, the A-B block copolymer used in the present invention becomes a block copolymer in which the molecular weight of the main chain is controlled by adjusting the use balance between the methacrylate-based monomers and the polymerization initiation compound in terms of the molar ratio when living radical polymerization is conducted. Specifically, a polymer in which the main chain has any molecular weight can be obtained by appropriately setting the number of moles of the monomers relative to the number of moles of the polymerization initiation compound. For example, when polymerization is conducted using 1 mole of a polymerization initiation compound and 500 moles of a monomer having a molecular weight of 100, a polymer having a theoretical molecular weight of "1×100×500=50000" can be obtained. That is to say, the theoretical molecular weight of the main chain polymer can be calculated by the following formula (1). In addition, the above-described "molecular weight" is a concept that includes both the number average molecular weight (Mn) and the weight average molecular weight (Mw).

"Theoretical molecular weight of main chain polymer"="1 mole of polymerization initiation compound"דmolecular weight of monomer"×"number of moles of monomer/number of moles of polymerization initiation compound"　　(1)

The amount of the polymerization initiation compound is as described previously.

In addition, polymerization may be accompanied by secondary reaction such as bimolecular termination or disproportionation in the polymerization step, and therefore it sometimes occurs that the main chain polymer having the above-described theoretical molecular weight may not be obtained. It is preferable that the A-B block copolymer used in the present invention is obtained without being accompanied by such secondary reaction. Moreover, the conversion may not be 100%. Further, polymerization may be completed by consuming the residual monomers with the polymerization initiation compound or the catalyst being added after the polymerization is once completed. That is to say, an A-B block copolymer of above-described structure having the particular main chain is produced by the aforementioned production method, and the A-B block copolymer used in the present invention may contain the A-B block copolymer as the main component. It can be said that a produced copolymer is the main component if the produced copolymer contains, preferably, 80% or more of the particular A-B block copolymer because the effect of using the particular A-B block copolymer is sufficiently obtained.

Moreover, with respect to the order of polymerization for obtaining polymer blocks in the A-B block copolymer used in the present invention, the polymer block B may be formed adding a mixed solution of monomers having a carboxy group after obtaining the polymer block A that is substantially water-insoluble through polymerization, and, conversely, polymerization may be conducted, after forming a polymer block from monomers having a carboxy group, adding monomers for forming the other polymer block so as to be substantially water-insoluble. It is preferable to conduct polymerization adding the monomers having a carboxy group after forming the polymer block that is substantially water-insoluble because there may be a possibility that the polymer block which is substantially water-insoluble contains the carboxy groups more than necessary and therefore dissolves in water by extra carboxy groups being mixed in the other polymer block after polymerizing in advance the monomers having a carboxy group.

In the manner as described above, the A-B block copolymer that can be utilized as the polymer I and that has a particular structure specified in the present invention can simply and surely be obtained. The aqueous emulsion solution of the present invention has a characteristic that the aqueous emulsion solution of the present invention has a particular form which has never conventionally been seen and in which the polymer I that incorporates the polymer II in the polymer block A and the polymer II are mixed together by: preparing an aqueous solution of the polymer I by neutralizing, with an alkali, the carboxy groups of the polymer block B in the A-B block copolymer; and then forming the polymer II by adding the monomer containing a hydrophobic addition polymerizable monomer to the aqueous solution and conducting polymerization. The alkali for neutralization used in forming the aqueous solution of the polymer I is not particularly limited, and a conventionally known alkali can be used. As the Specific examples thereof, ammonia; alkanol amines such as monoethanolamine, diethanolamine, and triethanolamine; alkali metal hydroxides such as lithium hydroxide, sodium hydroxide, and potassium hydroxide; and so on are used, and these alkalis are used in an amount of 60% or more, more preferably 100% or more of the carboxylic groups to solubilize the carboxy group in water.

Next, the polymer II will be explained. The polymer II is, as mentioned previously, a polymer that is finely dispersed and emulsified by the polymer I, the polymer having a high molecular weight and forming a coating film that is tough and has a high adhesiveness to the substrate. As the polymer II, a conventionally known addition polymerizable monomer is used, and the polymer II is obtained by conducting emulsion polymerization adding a monomer for forming the polymer II under the presence of the polymer I in an aqueous solution.

Examples of the conventionally known addition polymerizable monomer that can be used in the above-described polymerization include the followings. As the vinyl-based monomer, vinyl group-binding monomers such as styrene, vinyltoluene, vinyl acetate, N-vinylpyrrolidone, acrylonitrile, methacrylonitrile, and vinylpyridine; acrylate-based monomers in which the methacrylic group in the methacrylates described previously is substituted by an acrylic group; the methacrylate-based monomers described previously; amide-based monomers such as acrylamide, methacrylamide, and N,N-dimethyl methacrylamide; and so on can be used. Moreover, examples of the addition polymerizable monomer include reactive monomers such as N-methylolacrylamide. Further, the following monomers that cannot be used for the polymer I because there is a possibility of reacting with a carboxy group can be used. As an example of a monomer having a glycidyl group, glycidyl methacrylate can be used. As an example of a monomer having an isocyanate group, methacryloyloxyethyl isocyanate can also be used. Besides, monomers obtained by reacting a dibasic acid such as phthalic acid or succinic acid with hydroxyethyl (meth)acrylate can also be used, and by using the above-listed monomers, the carboxy group can be introduced in the polymer II, and, as a result thereof, an effect of improving adhesiveness is exerted when a coating film is formed.

Moreover, when the ultraviolet ray-absorbing group such as 2-(2'-hydroxy-5-methacryloyloxyethylphenyl)-2H-bezotriazole is introduced as described previously, the ultraviolet ray-absorbing ability is imparted to the polymer II that is a coating film-forming component, and the light fastness of the coating film can be improved and further the light fastness of the dyes or pigments used in preparing inks can be improved.

Further, as the addition polymerizable monomer that is a component for forming the polymer II, multifunctional crosslinkable monomers such as divinylbenzene, ethylene glycol di(meth)acrylate, and trimethylolpropane tri(meth)acrylate can also be used as necessary. It is preferable that these crosslinkable monomers are used because the polymer II having a further higher molecular weight is prepared and furthermore the polymer II takes a three-dimensional structure to form a coating film that is tougher and has a higher adhesiveness.

Furthermore, macromonomers such as polystyrenes having a terminal (meth)acrylate can be used. Besides, a polymer such as a polyether, a polyester, or a polyurethane may be dissolved as another polymer component, although such a polymer does not have an action of causing the polymerization to occur, in the monomer that is a component for forming the polymer II to make it possible to prepare a polymer in which different kinds of polymers are mixed therein.

As the addition polymerizable monomer that is a component for forming the polymer II, at least anyone of styrene, vinyltoluene, and a (meth)acrylate containing an aliphatic, alicyclic, or aromatic group having a number of carbon atoms of 1 to 18 may preferably be used as an essential component because of their versatility. Examples of the (meth)acrylate containing an aliphatic, alicyclic, or aromatic group having a number of carbon atoms of 1 to 18 include the methacrylates described previously and the corresponding acrylates thereof. These monomers can be used for forming part of the polymer II or for forming the whole polymer II.

Moreover, in the polymer II that constitutes the aqueous emulsion solution of the present invention and that is obtained by polymerizing the monomer containing the hydrophobic addition polymerizable monomer as described above, the film-forming property is important because the polymer II is intended to serve as a coating film component. The glass transition temperature (Tg) of the polymer II contributes to the film-forming property, and, according to the studies conducted by the present inventors, Tg of the polymer II is preferably 70° C. or lower, more preferably 60° C. or lower. In the case of Tg higher than 70° C., it becomes necessary to conduct heating at a high temperature for the purpose of drying, and besides there is a possibility that the heating takes time. Furthermore, the formed film is hard because of high Tg, and there is a possibility that the formed film breaks in a bending test or the like. It is preferable that the film has flexibility and it is more preferable that Tg is lower in order to follow the bending to the film. However, even if the polymer II has a Tg higher than 70° C., the film-forming property can be enhanced by adding a film-forming assistant such as a solvent having a high boiling point. The glycol-based solvents described previously are suitable as the solvent used for enhancing the film-forming property and having a high boiling point. However, when the aqueous emulsion solution of the present invention contains a solvent having a high boiling point, there is a possibility that the formed film becomes soft and the strength of the formed film is weakened because such a solvent is hard to volatilize, and therefore it is preferable not use a solvent.

In addition, with respect to Tg, Tg may be measured by conducting thermal analysis of a polymerized product obtained by polymerizing monomers to be used, or, simply, a value that can be determined by calculation from the monomers to be used in the synthesis may be used. As the formula by which Tg can simply be calculated, Tg of the copolymer can be calculated from:

$$1/T = W1/(T1+273) + W2/(T2+273) + \ldots + Wx/(Tx+273)$$

where Tg of the polymer obtained by copolymerizing the monomer of the component x is represented by T, the respective weight composition ratio of the component x is represented by W1, W2, . . . Wx, and Tg of the respective homopolymers are represented by T1, T2, . . . Tx; and the obtained value may be used as Tg of the copolymer. As Tg of the homopolymer, a value described in Polymer Handbook 4th Edition may be used, or various literature values may be used.

Moreover, the molecular weight of the polymer II that constitutes the aqueous emulsion solution of the present invention is not limited from the following reason. The aqueous emulsion solution of the present invention is, as described previously, obtained by conducting radical polymerization adding the monomer that is used for forming the polymer II and that contains at least a hydrophobic addition polymerizable monomer to an aqueous solution of the polymer I and mixing the polymer II together with the polymer I. Therefore, the aqueous emulsion solution of the present invention is a mixture of the polymer I and the polymer II in which the polymer II is incorporated in the particles of the polymer block A of the polymer I by polymerizing the addition polymerizable monomer to be mixed together with the polymer I, and it is difficult to measure the molecular weight of the polymer II alone in the state of emulsion. However since the molecular weight of the polymer II is sufficiently larger than the molecular weight of the polymer I, the peak of the polymer II is observed in the GPC measurement in such a way that the peak of the polymer II and the peak of the polymer I overlap, and it is shown that the molecular weight at the peak top of the polymer II is sufficiently large. The molecular weight of the peak top is preferably 50000 or more, more preferably 70000 or more.

As described above, the aqueous emulsion solution of the present invention basically consists of the polymer I and the polymer II, the mass ratio of the polymer I to the polymer II is represented by polymer I:Polymer II=5 to 80:95 to 20. The mass ratio is more preferably represented by polymer I:polymer II=20 to 70:80 to 30, furthermore preferably polymer I:polymer II=35 to 50:65 to 50. When the ratio of the polymer I is less than 5, the amount of the polymer I is not sufficient for dispersing and emulsifying the polymer II, and when the ratio of the polymer I is larger than 80, the amount of the polymer II becomes relatively small and therefore it sometimes occurs that the effect of the present invention as the coating film cannot be obtained. Similarly, when the ratio of the polymer II is less than 20, it sometimes occurs that the effect as the coating film of the present invention cannot be obtained. On the other hand, when the ratio of the polymer I is larger than 95, the obtained particles are inferior in stability and there is a possibility that precipitation occurs during polymerization. Moreover, the particle diameter of the obtained emulsion becomes too large, and there is a possibility that the deterioration of filterability occurs and further, when used for an inkjet ink, there is a possibility that the clogging of the head occurs.

Next, the method for producing the aqueous emulsion solution of the present invention will be explained more specifically. In the production method, first of all, the carboxy group of the polymer block B in the A-B block copolymer is neutralized with an alkali in water. Then, since the polymer block A in the A-B block copolymer is water-insoluble, the polymer block A becomes in a form of fine particles and the polymer block B dissolves in water, and the polymer I that constitutes the present invention becomes transparent or semitransparent finely dispersed and emulsified state. The radical polymerization initiator is further added thereto and the monomers that are components for forming the polymer II and that contain at least a hydrophobic addition polymerizable monomer are added, or the radical polymerization initiator is dissolved and added in the above-described monomers that are components for forming the polymer II, then the added monomers are subjected to radical polymerization. By constituting the aqueous emulsion solution of the present invention as described above, the aqueous emulsion solution of the present invention having a particular form in which the water-insoluble polymer II is mixed together with the polymer I to be dispersed and emulsified in such a form that the polymer II is incorporated in the particles of the polymer block A in the A-B block copolymer which is utilized for the polymer I is prepared.

The method for preparing the polymer I by solubilizing the A-B block copolymer in water is as described previously, and the liquid medium to be used contains water as a main component, and a water-soluble organic solvent may be used as part of the liquid medium as necessary together with water. As the water-soluble organic solvent, alcohols, glycols, or the like described previously are used, and the use amount thereof is about 0 to about 20 mass % in the liquid medium. When the water-soluble organic solvent is used in an amount larger than 20 mass %, the organic solvent is incorporated in the particles and there is a possibility that the organic solvent destroys the dispersed and emulsified state of the aqueous emulsion solution of the present invention due to swelling or aggregation of the particles. The use amount of the organic solvent is preferably set to 10 mass % or less in the liquid medium.

The water-soluble organic solvent described above is not particularly limited, and examples thereof include an organic solvent that can be mixed in water in an amount of 20 mass % or more, and a water-soluble organic solvent that can be perfectly mixed with water may preferably be used. Moreover, the solvent that has been used during polymerization for obtaining the A-B block copolymer can be used as it is.

The concentration of the polymer I that constitutes the aqueous emulsion solution of the present invention relative to water is not particularly limited, but is preferably 10 mass % to 30 mass %. The concentrations of the polymer I and polymer II that constitute the aqueous emulsion solution of the present invention are adjusted so as to satisfy the previously described mass ratio of the polymer I to the polymer II as specified in the present invention, however it is not preferable that the concentration of the polymer I relative to water is less than 10 mass % because the concentration is too low and the polymerization for allowing the polymer II to exist does not favorably progress, and therefore it sometimes occurs that the conversion does not increase as expected. On the other hand, it is not preferable that the concentration of the polymer I relative to water is larger than 30 mass % because the solid content of the obtained aqueous emulsion solution becomes too high and it sometimes occurs that the viscosity of the aqueous emulsion solution becomes too high.

Therefore, it is preferable to produce the aqueous emulsion solution of the present invention in the manner as described below. That is to say, polymerization is conducted adding the radical polymerization initiator to the aqueous solution of the polymer I having the concentration as described above, and also adding the monomers that are components for forming the polymer II and that contain a hydrophobic addition polymerizable monomer, or polymerization is conducted adding a mixed solution obtained by adding the radical polymerization initiator to the above-described monomers that are components for forming the polymer II to the aqueous solution of the polymer I having the concentration as described above. The radical polymerization initiator used in the polymerization is not particularly limited, and aqueous or oil-based radical polymerization initiators can be used. Specifically, as the water-soluble radical initiator, peroxide-based initiators such as ammonium persulfate and potassium persulfate, water-soluble azo initiators such as 2,2'-azobis(2-methylpropionamidine)dihydrochloride salt, and so on are used. When the water-soluble radical polymerization initiators are used, it is preferable to add these water-soluble radical polymerization initiators into water to dissolve in advance. Moreover, as the oil-based radical polymerization initiator, peroxides such as benzoyl peroxide, and azo-based initiators such as azobisisobutyronitrile can be used, and these oil-based radical polymerization initiators may be added to water in advance, however these oil-based polymerization initiators are water-insoluble and therefore is preferably dissolved in the monomer to be used, and then the resultant mixed solution containing the monomer is added to the aqueous solution of the polymer I. The amount of the radical initiator is, but not particularly limited to, 0.1 mass % to 5 mass % relative to the monomer, more preferably 0.5 mass % to 3 mass %.

Moreover, the polymerization temperature in the above-described polymerization is not particularly limited. For example, the polymerization temperature can be set based on the 10-hour half-life of the radical polymerization initiator to be used. The polymerization temperature is preferably set to the temperature of the 10-hour half-life or higher.

The method for adding the monomers that are components for forming the polymer II in the above-described polymerization is not particularly limited. All the monomers may be added in advance, however it is preferable to gradually drop the monomers over time. That is to say, by gradually dropping the monomers, stable emulsion particles in which the monomers that are components for forming the polymer II are uniformly incorporated in the particles of the polymer block A and polymerized to allow the polymer I and the polymer II to be mixed together, the emulsion particles having a uniform particle diameter can be prepared.

The polymerization time is also not particularly limited, however it is important that the radical polymerization initiator sufficiently decomposes and disappears and that the conversion is increased to such an extent that the residual monomers do not exist, and it is preferable to conduct polymerization until such a state is realized.

Besides, another additive may be added in the polymerization. Specific examples of the additive include an antiseptic agent, a pH adjusting agent, a leveling agent, the organic solvents previously described, and a coloring agent such as a dye, and further the addition of a surface active agent for the purpose of preventing the particles having different shapes from aggregating is included. Moreover, another resin may be mixed together with other ingredients as necessary to prepare the aqueous emulsion solution of the present invention. The resin is a conventionally known water-based resin, and a solution of a conventionally known water-soluble resin or emulsion can be used. Specifically, for example, a solution of a styrene-based resin, an acryl/styrene-based resin, an acryl-based resin, a vinyl alkane acid-based resin, a urethane-based resin, an ester-based resin, an olefin-based resin, or an amide-based resin, and emulsions thereof can be used. However, in the case of the aqueous solution, there is a possibility that the dissolving polymer deteriorates the ejection stability, and therefore emulsions are preferably used.

The aqueous emulsion solution of the present invention containing the polymer I and the polymer II mixed together therein can simply and stably be obtained in the method as describe above. It is preferable that the average particle diameter of the particle contained in the aqueous solution is 20 to 300 nm obtained by light scattering measurement. The average particle diameter can be measured by a conventionally known method for measuring the particle diameter of emulsion particles. In the present invention, a value measured with a particle diameter measurement apparatus by light-scattering method is used. When the average particle diameter is less than 20 nm, the particles are too fine and it sometimes occurs that the viscosity of the ink increases, and, on the other hand, when the average particle diameter exceeds 300 nm, there is a possibility that clogging of the head occurs in the ejection of inkjet. The average particle diameter is more preferably 20 to 200 nm, further more preferably 30 to 110 nm. The explanation of the aqueous emulsion solution of the present invention ends here.

Next, the coloring agent composition that is constituted using the aqueous emulsion solution of the present invention and the inkjet ink using the coloring agent composition will be explained. First of all, the coloring agent compositions of the present invention include a coloring agent composition containing, as constituents, at least a dye and/or a pigment, water, a water-soluble organic solvent, and the aqueous emulsion solution of the present invention described previously. The dye or pigment used in preparing the coloring agent composition is not particularly limited, and various dyes or pigments that have conventionally been used in printing can be used.

With respect to dyes, specifically, aqueous dyes can be used, and it sometimes occurs that oil-based dyes can be used as will be mentioned below. The oil-based dyes are originally water-insoluble, however even the oil-soluble dyes may sometimes be used because there are cases that the oil-soluble dyes dissolve in the organic solvent existing in the coloring agent composition of the present invention and that the oil-soluble dyes are contained in the particles where the polymer I and the polymer II that constitute the aqueous emulsion solution of the present invention are mixed together. The dye is not particularly limited, and conventionally known dyes can be used. As the examples of the dye, dyes having various C.I. numbers such as acid red dyes, acid blue dyes, acid yellow dyes, basic red dyes, basic blue dyes, basic violet dyes, direct red dyes, direct blue dyes, direct yellow dyes, direct black dyes, oil red dyes, oil blue dyes, oil black dyes, and fluorescent dye stuffs, and dye stuffs the light fastness of which is improved and which are available from various manufacturers can be used. Furthermore, polymers to which dye stuffs are bonded, or the like can sufficiently be used.

Moreover, pigments include, but not particularly limited to, conventionally known inorganic pigments or organic pigments. Pigments having various C.I. numbers can be used, and examples thereof include carbon black pigments, quinacridone-based pigments, phthalocyanine-based pigments, benzimidazolone-based pigments, isoindolinone-based pigments, azo-based pigments, titanium oxide pigments, and so on. The examples also include pigments that is used particularly in inkjet inks such as Color Index number (C.I.) Pigment Blue 15:3 and 15:4, C.I. Pigment Red 122 and 269, C.I. Pigment Violet 19, C.I. Pigment Yellow 74, 155, 180, and 183, C.I. Pigment Green 7, 36, and 58, C.I. Pigment Orange 43, C.I. Pigment Black 7, and C.I. Pigment White 6.

Besides, self-dispersible pigments which are obtained by introducing water-soluble groups on the surface of the pigments or which are encapsulated with a resin can also be used as the pigment in the coloring agent composition of the present invention. Examples of the self-dispersible pigment include carbon blacks which are obtained by introducing acid groups and which are sold from various carbon black manufacturers and self-dispersible pigments manufactured by Cabot Corporation, and so on. One or more of these dyes or pigments are used, and the dye and pigment may be used together.

The content of the above-described dye or pigment in the coloring agent composition of the present invention is not particularly limited. For example, the dyes are suitably used within a range from about 0.5 to about 10 mass %, and in the case of the pigments, the organic pigments are suitably used within a range from about 1 to about 30 mass %, and the inorganic pigments are suitably used within a range from about 5 to about 60 mass %.

In the coloring agent composition of the present invention, water and a water-soluble organic solvent are used as liquid media. As the water-soluble organic solvent, the alcohols, glycols, polyhydric alcohols, and so on described previously can appropriately be used, and the blending amount thereof is also arbitrary and is not particularly limited. Examples of the water-soluble organic solvent, which are already listed previously, include, but not particularly limited to, water-soluble lower aliphatic alcohols such as ethanol, isopropanol, water-soluble ketone-based organic solvents such as acetone, water-soluble ester solvents such as ethyl lactate, water-soluble ether-based solvents such as tetrahydrofuran, ethylene glycol dimethyl ether, and diethylene glycol dimethyl ether, water-soluble glycol-based solvents such as propylene glycol, ethylene glycol, and monoalkyl ethers thereof, water-soluble amide-based solvents such as N-methylpyrrolidone, water-soluble polyol solvents such as glycerin and 1,2-hexanediol, and so on, and one or more of these are used. More preferably, when the case that the water-soluble organic solvent is used for inkjet inks is taken into consideration, one or more of the water-soluble organic solvents that prevent the head from drying such as diethylene glycol monobutyl ether, triethylene glycol monobutyl ether, glycerin, propylene glycol, 1,2-hexanediol, 2-pyrrolidone, and N-methyl-2-pyrrolidone may be used together.

The aqueous emulsion solution of the present invention is added to the dye and/or pigment and liquid medium as described above to prepare the coloring agent composition of the present invention. The addition amount of the aqueous emulsion solution in preparing the coloring agent composition of the present invention may appropriately be determined according to the amount of polymer components contained in the emulsion for obtaining the required coating-film performance and tinting strength. The aqueous emulsion solution may preferably be contained in an amount of 0.5 to 20 mass % of the whole coloring agent composition, and the amount thereof is adjusted as a coating film component in accordance with the use application.

In the case of the water-soluble dye among the dyes, the coloring composition can be obtained by adding the water-soluble dye in the liquid medium to mix and solubilize. In the case of the oil-soluble dye, the organic solvent is added to the oil-soluble dye so as to dissolve the oil-soluble dye and the resultant mixture is stirred to make the mixture uniform, or the oil-soluble dyes are stirred with the emulsion particles so that the oil-soluble dyes are incorporated in the emulsion particles to make the mixture of the oil-soluble dye and the emulsion particles uniform. In the case of the self-dispersible pigment among the pigments, the self-dispersible pigment is added to the above-described liquid medium, and the resultant mixture is stirred, preferably through the dispersion step, thereby dispersing the pigment. In the case of the self-dispersible pigment, the pigment dispersant is not necessary in particular. Examples of dispersion apparatus include kneading machines such as a kneader, a two-roll, a three-roll, and Miracle KCK (manufactured by Asada Iron Works Co., Ltd., product name), an ultrasonic disperser, and high-pressure homogenizer such as Microfluidizer (manufactured by Mizuho Industrial Co., Ltd., product name), Nanomizer (manufactured by Yoshida Kikai Co., Ltd., product name), Starburst (manufactured by Sugino Machine Limited, product name), G-smasher (manufactured by RIX Corporation, product name), and so on. Moreover, a ball mill, a sand mill, a transverse-type medium mill disperser and a colloid mill can be used among the apparatuses using a bead medium such as glass or zircon medium, and the dispersion method is not particularly limited and any method can be selected.

In the case of the pigment, since the pigment is not dispersed as it is, the pigment dispersant is used to disperse the pigment by the above-described dispersion method. As the pigment dispersant, conventionally known pigment dispersants are used, and examples thereof include randomly polymerized products such as acryl-based and styrene-based polymers, block copolymer type dispersants, graft copolymer type dispersants, star-shaped polymeric dispersants, hyper branch type dispersants, and so on. The pigment dispersant is used in an arbitrary amount relative to the amount of the pigment, and, for example, the amount is such that the amount of the dispersant is 1 to 100 mass parts relative to 100 mass parts of the pigment, more preferably 5 to 50 mass parts.

In the coloring composition of the present invention, the desirable dispersed particle diameter of the pigment is as described previously, and when the color developing properties such as optical density and chroma, and print quality of inks, or sedimentation of the pigment in inks are taken into consideration, the average particle diameter is 150 nm or less for organic pigments and 300 nm or less for inorganic pigments. For the purpose of obtaining a pigment dispersion having a desired particle size distribution, various methods in which: the size of the pulverizing medium in a disperser is made small; the packing ratio of the pulverizing medium is made large; the processing time is made long; the ejection speed is made slow; and the particles are classified after pulverization with a filter or a centrifugal separator are used. Or, the combination of these methods are given as the examples of the method. Furthermore, a method can be used in which the pigment to be used the primary particle diameter of which is adjusted to be fine in advance by a conventionally known method such as, for example, a salt milling method is used. It is preferable to remove coarse particles with a centrifugal separator or a filter after dispersion.

It is particularly preferable that the pigment dispersant is similar to the A-B block copolymer used for the polymer I that constitutes the present invention. The A-B block copolymer used in the present invention consists of the polymer block A that does not dissolve in water and the polymer block B that dissolves in water, the polymer block A is remarkably adsorbed to the pigment, and the polymer block B dissolves in water, thereby making it possible to finely disperse the pigment. Moreover, the A-B block copolymer, when used as the pigment dispersant, becomes in the same state as that of the polymer I which stably disperses and emulsifies, in water, the polymer II that constitutes the aqueous emulsion solution. Accordingly, since the polymer as the pigment dispersant in the liquid medium and the polymer I that stabilizes the polymer II are the same, the phase separation, aggregation, or the like does not occur and a coloring composition that maintains a high degree of dispersibility can be prepared when the ink is prepared or printing is conducted. Moreover, when printing is conducted, since the polymer as the pigment dispersant and the polymer I as the stabilizing agent for the emulsion are the same, poor compatibility, phase separation, and whitening do not occur, thereby making it possible to give favorable printed matter.

An additive is added as necessary to the coloring agent composition of the present invention to prepare an ink. As the additive, surface active agents, pigment derivatives, dyes, leveling agents, antifoaming agents, ultraviolet ray-absorbing agents, and so on can be used, and the additive is not particularly limited.

Water, a water-soluble organic solvent, and an additive are added to the coloring agent composition obtained in the manner as described above to prepare an ink. The concentration of dyes are adjusted so as to be 0.5 to 7 mass %, and the concentration of pigments are adjusted so as to be 1 to 10 mass %. It is preferable that the addition amount of the aqueous emulsion solution of the present invention is such that the amount of the polymer components contained in the aqueous emulsion solution is 50 to 300 mass parts relative to 100 mass parts of the dye and/or the pigment to be used. When the amount of the polymer components is less than 50 mass parts or less, the dye stuff component becomes too large and it sometimes occurs that the strength of the coating film is not sufficient, and when the amount of the polymer components is larger than 300 mass parts, the concentration of the dye stuff that is used becomes relatively small and it sometimes occurs that the tinting strength is lowered. The amount of the polymer components is more preferably 50 to 200 mass parts.

Moreover, in the inkjet ink of the present invention, the surface active agents, water-soluble organic solvents, antifoaming agents, and so on can be used as described previously. It is preferable that the inkjet ink of the present invention contains at least a surface active agent added therein from the standpoint that the dot diameters printed by inkjet are extended to the optimum width by the surface tension within a range of 20 mN/m or more and 40 mN/m or less. Publicly known surface active agents can be used. It is preferable that the addition amount of the surface active agent is 0.01 to 5 mass % because when the addition amount is large, it sometimes occurs that the dispersion stability of the pigment is impaired, more preferably 0.1 to 2 mass %.

The viscosity of the obtained ink is not particularly limited, however the viscosity of the inkjet inks containing a dye or a pigment may be 2 to 10 mPa·s, and the viscosity of the inkjet inks containing an inorganic pigment may be 5 to 30 mPa·s.

As described above, the aqueous emulsion solution of the present invention makes it possible to provide an inkjet ink that is utilized as a coating film-forming component suitable for the inkjet printing system and that gives excellent effects. Specifically, the ink: that is excellent in printability such as high speed printing capability and ejection stability; that is particularly useful for aqueous pigment inkjet inks in which a pigment is used as a colorant; that is excellent in redispersibility by which the pigment can easily be redispersed even when the ink dries in the head on printers; and further that can form the printed matter having adhesiveness to various substrates, can be made. The inkjet ink of the present invention is applicable to inkjet printers for consumers, industrial use, textile printing, etc. that use aqueous inks. With respect to media as substrates for printing, the inkjet ink of the present invention is applicable to plain paper, glossy paper, matte paper, films including vinyl chlorides and polyesters such as PET, fiber such as cotton and polyesters, and metals such as an aluminum plate, and other media. Moreover, as described above, it is preferable that the aqueous emulsion solution of the present invention is added to inkjet inks, however use application of the aqueous emulsion solution of the present invention is not limited to inkjet inks, and the effect of the present invention can also be obtained by applying the aqueous emulsion solution of the present invention on the above-described substrate in advance and thereafter conducting printing or by applying the aqueous emulsion solution of the present invention as an overcoat on the printed matter.

EXAMPLES

Hereinafter, the present invention will be explained more specifically giving Examples and Comparative Examples, however the present invention is not limited at all by these examples. In addition "parts" or "%" in the description is based on mass unless otherwise specifically noted.

Example 1

Synthesis of Polymer I-1 and Emulsion (Em-1) Using Polymer I-1

[Synthesis of Polymer I-1]

First of all, in a reaction apparatus of a 2 L separable flask equipped with a stirrer, a back flow condenser, a thermometer, and a nitrogen-introducing tube, the following materials were charged, and the polymer block A constituting the A-B block copolymer utilized for the polymer I specified in the present invention was synthesized in the manner as described below. Specifically, in the reaction apparatus, 828.4 parts of diethylene glycol monobutyl ether (hereinafter, abbreviated as BDG) as the organic solvent; 3.8 parts of iodine and 14.0 parts of 2,2'-azobis(4-methoxy-2,4-dimethylvarelonitrile) (hereinafter, abbreviated as V-70) for the purpose of obtaining an iodine compound as the polymerization initiation compound; 0.22 parts of N-iodosuccinimide as the catalyst; further 213.9 parts of benzyl methacrylate (hereinafter, abbreviated as BzMA); and 19.8 parts of 2-hydroxyethyl methacrylate (hereinafter, abbreviated as HEMA) were charged, stirred, and heated to 40° C. The brownish color of iodine disappeared in 3 hours, during which it was able to be confirmed that V-70 as the initiator reacted with iodine to produce a polymerization initiation compound as the iodine compound. Furthermore, polymerization was conducted for 5 hours maintaining the above-described temperature, and part of the reaction solution was taken as a sample at the end of polymerization. The solid content of the sampled product was measured to be 23.3%, and the conversion calculated based on the solid content was almost 100%. In addition, the conversion was calculated by this method in the other examples. Moreover, the molecular weight was measured by GPC to find that the number average molecular weight was 5500 and the PDI was 1.17. In the polymer, BzMA/HEMA=about 90/10. Furthermore, the sampled product was added to water to find that a resin was precipitated, and it was therefore confirmed that the polymer was water-insoluble. The polymer block A was obtained in the manner as described above.

Thereafter, the temperature of the above-described reaction solution was set to 40° C., then 234.8 parts of BzMA and 57.2 parts of methacrylic acid (hereinafter, abbreviated as MAA) were added thereto, and polymerization was conducted for 4.5 hours. Part of the reaction solution was taken as a sample at the end of polymerization to find that the conversion of the sampled product was almost 100%, and it was therefore confirmed that almost all the monomers were polymerized. Moreover, the molecular weight was measured by GPC to find that the number average molecular weight was 10800 and the PDI was 1.23. It was inferred that the A-B block copolymer was made because the peak of the molecular weight of the polymer block A shifted to a higher molecular weight region and the peak of the polymer block A was almost not observed. Moreover, the molecular weight of the polymer block B calculated from the number average molecular weight of the A-B block copolymer was 10800-5500=5300. Further, in the polymer block B, BzMA/MAA=80.4/19.6, and the theoretical acid value of the polymer block B itself was 127.8 mgKOH/g. Furthermore, as the composition of the A-B block copolymer, BzMA/HEMA/MAA=85.3/3.8/10.9, and the theoretical acid value was 71.1 mgKOH/g. The acid value of the sampled product after polymerization was measured by the method for measuring the acid value described previously to find that the acid value of the A-B block copolymer was 71.3 mgKOH/g, which was almost equal to the theoretical value.

Thereafter, 40.3 parts of 28% ammonia water and 235.8 parts of water were added under stirring to the polymerization solution obtained above, then the solution became transparent, and the polymer dissolved. Moreover, the solution was added to water to give an almost transparent aqueous solution with a slightly bluish color. It is considered that the reason is because carboxy groups contained in the polymer block B were neutralized and ionized and the polymer block B dissolved in water, thereby allowing the A-B block copolymer to be finely dispersed in the solution. From the above-described fact, it is also suggested that the A-B block copolymer specified in the present invention was made.

The ratio of the polymer block A in the A-B block copolymer obtained above was 44.4% expressed by a value of blending. Moreover, the solid content of the polymerization solution obtained above was measured to be 33.3%, and the value was almost equal to the theoretical value of blending. The solution of the polymer-1 is referred to as the aqueous polymer I-1 solution.

Thereafter, 1000 parts of the above-described aqueous polymer I-1 solution and 4000 parts of ion exchanged water were placed in a 10 L vat and stirred well with a disper. Next, 10% aqueous acetic acid solution was gradually added thereto while measuring the pH, and the neutralized and ionized carboxy groups (—COO⁻) were converted to the carboxy groups (—COOH), thereby making the resin water-insoluble and precipitate. The A-B block copolymer in the aqueous polymer I-1 solution was precipitated every time the aqueous acetic acid solution was added, the viscosity of the aqueous polymer I-1 solution was remarkably increased at a pH of around 7, however the aqueous acetic acid solution was added until the pH of the solution became 5 and the carboxy groups were completely neutralized, thereby making the resin water-insoluble and precipitate. The solution was filtered, and then the resin was washed well with ion exchanged water to obtain water paste of the polymer I-1. The solid content of the water paste was 65.0%, the acid value was measured to be 70.9 mgKOH/g, the number average molecular weight was 10800, and the PDI was 1.23. Moreover, when IR spectra were measured for the sample before and after precipitation with an infrared spectrophotometer, no changes were observed. In this manner, the polymer component was taken out from the aqueous polymer I-1 solution as the water paste. The water paste is referred to as the polymer I-1 water paste.

[Synthesis of Emulsion (Em-1)]

Next, a dropping apparatus was attached to the reaction vessel used in Synthesis of Polymer I-1 described previously, and, first of all, 3.5 parts of 28% ammonia water and 285.3 parts of ion exchanged water were added to 63.2 parts of the polymer I-1 water paste obtained above (the content of the polymer I-1=41.1 parts), and the resultant mixture was heated to 75° C. to dissolve the polymer I-1 in water. As a result thereof, the solution became a transparent aqueous solution with a (slight) bluish color. Part of the aqueous solution was taken as a sample, and when laser light was applied on the sample, the optical path of the laser light was observed to confirm a Tyndall phenomenon. Then, the measurement of the average particle diameter of the polymer in the aqueous solution was tried with a light scattering particle size distribution measuring apparatus. The particle size measuring apparatus used for the measurement was "NICOMP 380ZLS-S" (manufactured by Particle Sizing Systems), and the measurement of the average particle diameter of the polymers was tried using this apparatus in the same manner in the following examples.

In the above-described state, the measurement of the average particle diameter was tried, however the measurement of the average particle diameter was not able to be done even when the measuring concentration was raised. From this fact, it was suggested that the water-insoluble polymer block A was in a form of extremely fine particles and the polymer block B dissolved in water. Further, it is inferred that the average particle diameter of the polymer I-1 was 10 nm or less, which is undetectable with the measuring apparatus.

Then, after confirming that the temperature reached at 75° C., 0.6 parts of potassium persulfate (hereinafter, abbreviated as KPS) was added to the above-described solution obtained by dissolving the polymer I-1 in water, and a mixed solution of 43.1 parts of butyl acrylate (hereinafter, abbreviated as BA) and 18.5 parts of styrene (hereinafter, written as St) was dropped for 2 hours using the dropping apparatus describe previously. Then, the almost transparent solution gradually became white-colored by conducting polymerization while dropping the monomers to the solution to finally become an aqueous emulsion solution and form the polymer II. The polymer II is referred to as the polymer II-1. After the completion of dropping the monomers, polymerization was conducted further for 5 hours, and then the reaction solution was cooled and taken out. As a result thereof, a yellowish white aqueous emulsion solution with a slightly transparent feeling was obtained. The aqueous emulsion solution is referred to as Em-1.

The solid content of the obtained Em-1 was measured to be 25.0%, which was almost equal to the theoretical value. Moreover, the particle diameter of the particles in the Em-1 was measured with the light scattering particle size distribution measuring apparatus to find that the average particle diameter was 89 nm. Moreover, the pH was 9.0. Furthermore, the viscosity was measured with a BM type viscometer at a number of rotation of 60 rpm to be 5.9 mPa·s. In addition, the viscosities below were measured in the same manner.

The Em-1 was constituted from the polymer I as the protective colloid and the polymer II as the coating film component so that the ratio of the polymer I to the polymer II was 40:60, moreover the composition of the polymer II was BA/St=70/30, and the calculated value of Tg determined from the theoretical value of Tg was −23° C. Moreover, the molecular weight of the Em-1 was measured to find that the peak of the polymer II corresponding to a higher molecular weight component and the peak of the polymer I as the protective colloid were measured in such a way that both peaks overlapped. The molecular weight at the peak top of the polymer II was 100000. The GPC chart is shown in FIG. 1. In FIG. 1, the peak at the outflow time of 14.310 minutes is the peak of the polymer II, and the peak at the outflow time of 15.863 minutes is the peak of the polymer I. The molecular weight at the outflow time of 14.310 minutes is a molecular weight of 100000 in terms of polystyrene.

Examples 2 to 5

Emulsions (Em-2 to Em-5) Using Polymer I-1

Aqueous emulsion solutions Em-2 to Em-5 of Examples 2 to 5 of the present invention were each obtained in the same manner as in Example 1 with respect to each polymer composition, each blending amount, and so on. Specifically, the aqueous emulsion solutions Em-2 to Em-5 of Examples 2 to 5 of the present invention were each obtained by changing the ratio of the polymer I to the polymer II so that the ratio of the polymer I as the protective colloid to the polymer II as the coating-film component became as described in Table 1. The characters etc. of these aqueous emulsion solutions were determined in the same manner as in Example 1, which are shown together in Table 1. In addition, the values for the aqueous emulsion solution of Example 1 are also shown together in Table 1.

TABLE 1

Characters etc. of each aqueous emulsion solution

| | Example 1 | Example 2 | Example 3 | Example 4 | Example 5 |
|---|---|---|---|---|---|
| Name of aqueous emulsion solution | Em-1 | Em-2 | Em-3 | Em-4 | Em-5 |
| Polymer ratio (I/II) | 40/60 | 35/65 | 50/50 | 60/40 | 65/35 |
| Average particle diameter (nm) | 89 | 95 | 76 | 42 | 35 |

TABLE 1-continued

Characters etc. of each aqueous emulsion solution

|  | Example 1 | Example 2 | Example 3 | Example 4 | Example 5 |
|---|---|---|---|---|---|
| Solid content (%) | 25.0 | 25.0 | 24.9 | 25.1 | 25.0 |
| pH | 9.0 | 9.0 | 9.1 | 9.2 | 9.2 |
| Viscosity (mPa · s) | 5.9 | 4.9 | 6.2 | 7.8 | 8.1 |

From Table 1, it is understood that the average particle diameter becomes smaller as the ratio of the polymer I as the protective colloid is larger and the average particle diameter becomes larger as the ratio of the polymer II is larger. Moreover, it was able to be confirmed that all of the aqueous emulsion solutions had a low viscosity.

Examples 6 and 7

Emulsions (Em-6 and Em-7) Using Polymer I-1

The aqueous emulsion solutions Em-6 and Em-7 of the present invention were obtained in the same manner as in Em-1 of Example 1 except that the ratios of BA to St as the components for forming the polymer II were changed as shown in Table 2. These Examples are for studying the influence of Tg of the polymer II by changing Tg of the polymer II as a result of changing the ratios of BA to St. The characters etc. of these aqueous emulsion solutions were determined in the same manner as in Example 1, which are shown in Table 2. In addition, the values for the aqueous emulsion solution Em-1 of Example 1 are also shown together in Table 2.

TABLE 2

Characters etc. of each aqueous emulsion solution

|  | Example 1 | Example 6 | Example 7 |
|---|---|---|---|
| Name of aqueous emulsion solution | Em-1 | Em-6 | Em-7 |
| Polymer ratio (I/II) | 40/60 | 40/60 | 40/60 |
| Polymer II composition | BA/St = 7/3 | BA/St = 6/4 | BA/St = 5/5 |
| Theoretical Tg (° C.) of polymer II | −23 | −10.7 | 3 |
| Average particle diameter (nm) | 89 | 87 | 79 |
| Solid content (%) | 25.0 | 25.0 | 25.0 |
| pH | 9.0 | 9.0 | 9.0 |
| Viscosity (mPa · s) | 5.9 | 6.0 | 5.9 |

Examples 8 to 10

Emulsions (Em-8 to Em-10) Using Polymer I-1

The aqueous emulsion solutions Em-8 to Em-10 of the present invention were obtained in the same manner as in Example 1 except that the compositions of the components for forming the polymer II were changed as shown in Table 2. The characters etc. of these aqueous emulsion solutions were determined in the same manner as in Example 1, which are shown in Table 3. In addition, the values for the aqueous emulsion solution Em-1 of Example 1 are also shown together in Table 3.

TABLE 3

Characters etc. of each aqueous emulsion solution

|  | Example 1 | Example 8 | Example 9 | Example 10 |
|---|---|---|---|---|
| Name of aqueous emulsion solution | Em-1 | Em-8 | Em-9 | Em-10 |
| Polymer ratio (I/II) | 40/50 | 40/60 | 40/60 | 40/60 |
| Polymer II composition | BA/St = 7/3 | 1% EDMA added to BA/St = 7/3 | BA/St/ACMP = 4/2/2 | BA/St/PAMA = 4/2/2 |
| Theoretical Tg (° C.) of polymer II | −23 | −23 | (−20° C. or lower) | 13.3 |
| Average particle diameter (nm) | 89 | 90 | 87 | 102 |
| Solid content (%) | 25.0 | 25.2 | 24.8 | 25.2 |
| pH | 9.0 | 9.2 | 9.1 | 8.7 |
| Viscosity (mPa · s) | 5.9 | 5.7 | 5.8 | 7.1 |

EDMA: diethylene glycol dimethacrylate
ACMP: para-cumylphenylethyl methacrylate (manufactured by Shin-Nakamura Chemical Co., Ltd.)
PAMA: monomethacryloyloxyethyl phthalate The object of the Em-8 was to allow the polymer II to have a crosslinked structure resulting in the formation of a tough coating film by adding diethylene glycol methacrylate being a bifunctional methacrylate to the components for forming the polymer II. When the dried coating film of Em-8 was immersed in THF, the film became ragged, however the film was insoluble to THF, and therefore it was confirmed that the polymer II was sufficiently crosslinked in the system. Moreover, the object of the Em-9 was to improve the adhesiveness to substrates to be printed by introducing a polycyclic aromatic group being a para-cumyl group in the polymer II. Further, the object of the Em-10 was to obtain the similar effect to that of Em-9 by introducing aromatic rings and carboxy groups in the polymer II. However, the aqueous emulsion solution lost semitransparency and became white emulsion with a slight bluish color probably because PAMA that was used in Em-10 had a carboxy group and therefore the carboxy groups of PAMA were neutralized in the above-mentioned polymerization process for forming the emulsion. From above-described results, it was confirmed that various monomers were applicable as the monomer for forming the polymer II, thereby making it possible to impart novel properties to emulsion.

Examples 11 to 14

Emulsions (Em-11 to Em-14) Using Polymer I-1

Next, emulsions each having a higher Tg than the Em-1 of Example 1 were prepared from the components for forming the polymer II according to compositions shown in Table 4. The characters etc. of these aqueous emulsion solutions were determined in the same manner as in Example 1, which are shown in Table 4. In addition, the values for the aqueous emulsion solution Em-1 of Example 1 are also shown together in Table 4.

improving the light fastness more than the Em-1 of Example 1. In addition, the RUVA is a powder, and therefore RUVA was mixed and dissolved in another monomer in advance to

TABLE 4

Characters etc. of each aqueous emulsion solution

|  | Example 1 | Example 11 | Example 12 | Example 13 | Example 14 |
|---|---|---|---|---|---|
| Name | Em-1 | Em-11 | Em-12 | Em-13 | Em-14 |
| Polymer ratio (I/II) | 40/60 | 40/60 | 40/60 | 40/60 | 40/60 |
| Polymer II composition | BA/St = 7/3 | BMA/St = 7/3 | BMA/ DCPDMA/St = 33.4/33.3/33.3 | MMA/BMA/ BA/MAA = 28/67/4.5/0.5 | MMA/BMA/ BA = 53/30/17 |
| Theoretical Tg of polymer II | −23° C. | 47.5° C. | 50° C. | 46° C. | 60° C. |
| Average particle diameter (nm) | 89 | 89 | 93 | 84 | 81 |
| Solid content (%) | 25.0 | 24.8 | 24.9 | 24.9 | 25.1 |
| pH | 9.0 | 9.1 | 9.1 | 9.0 | 9.0 |
| Viscosity (mPa · s) | 5.9 | 5.9 | 6.3 | 8.2 | 6.0 |

BMA: butyl methacrylate
DCPDMA: dicyclopentanylethyl methacrylate (manufactured by Hitachi Chemical Co., Ltd., product name FA-512M)
MMA: methyl methacrylate The Em-11 is the emulsion in which BMA is used in place of BA in the polymer II used in Example 1 to make Tg higher. Moreover, the Em-12 is the emulsion in which dicyclopentanyl having an air-drying property is introduced in the monomers of the polymer II of the Em-11 to further improve the adhesiveness. Further, Em-13 and Em-14 are constituted only from methacrylates without containing styrene.

Examples 15 to 18

Emulsions (Em-15 to Em-18) Using Polymer I-1

Next, emulsions in which functional monomers were introduced were prepared from the components for forming the polymer II according to the compositions as shown in Table 5. The characters etc. of these aqueous emulsion solutions were determined in the same manner as in Example 1, which are shown in Table 5. In addition, the values for the aqueous emulsion solution Em-1 of Example 1 are also shown together in Table 5.

conduct dropping. The Em-16 is a self-reactive emulsion in which a glycidyl group is contained in the polymer II, and when the coating film is made, the carboxy group of the polymer I and the glycidyl group of the polymer II react with each other to form a crosslinked coating film. In addition, ammonia used for dissolving the polymer I in water was used in an amount of 80 mol % relative to the carboxy group of the polymer I in the synthesis of the Em-16. The object of the Em-17 was to prepare an emulsion exerting water-repellent property and oil-repellent property to have an effect of contamination resistance by allowing fluorine-based monomers to be contained in the component for forming the polymer II. The object of the Em-18 was to improve the adhesiveness to inorganic, glass, and metal plates by introducing phosphate groups in the polymer II. In addition, there is a possibility that P1M works as a surface active agent because phosphate groups are neutralized in the emulsion polymerization used in the present invention, which, however, causes no problem in particular. As described above, it was confirmed that various monomers

TABLE 5

Characters etc. of each aqueous emulsion solution

|  | Example 1 | Example 15 | Example 16 | Example 17 | Example 18 |
|---|---|---|---|---|---|
| Name | Em-1 | Em-15 | Em-16 | Em-17 | Em-18 |
| Polymer ratio (I/II) | 40/60 | 40/60 | 40/60 | 40/60 | 40/60 |
| Polymer II composition | BA/St = 7/3 | MMA/CHA/ RUVA = 50/30/20 | MMA/2EHA/ GMA = 45/45/10 | MMA/2EHA/ 17FE = 40/10/50 | MMA/BMA/ BA/P1M = 50/30/17/1 |
| Theoretical Tg of polymer II | −23° C. | 68.1° C. | −16.4° C. | 23.7° C. | 60° C. |
| Average particle diameter (nm) | 89 | 99 | 88 | 73 | 88 |
| Solid content (%) | 25.0 | 25.2 | 24.8 | 25.2 | 24.7 |
| pH | 9.0 | 9.2 | 8.2 | 9.2 | 8.8 |
| Viscosity (mPa · s) | 5.9 | 6.3 | 5.7 | 4.9 | 8.8 |

RUVA: 2-(2'-hydroxy-5-methacryloyloxyethylphenyl)-2H-benzotriazole (manufactured by Otsuka Chemical Co., Ltd., product name RUVA 93, homopolymer Tg 71° C. from catalogue)
CHA: cyclohexyl acrylate
2EHA: 2-ethylhexyl acrylate
GMA: glycidyl methacrylate
17FE: heptadecafluorodecyl methacrylate (homopolymer Tg 8° C.)
P1M: methacryloyloxyethyl phosphate (manufactured by Kyoeisha Chemical Co., Ltd., product name P-1M)

RUVA used for forming the polymer II of the Em-15 is for imparting the ultraviolet ray-absorbing ability to the polymer II and allowing the polymer II to have a function of were applicable as the monomer for forming the polymer II, thereby making it possible to impart novel properties to emulsion.

Example 19

Synthesis of Polymer I-1 and Emulsion (Em-19) Using Polymer I-1

In the present Example, the A-B block copolymer was prepared through polymerization without conducting the precipitation of a resin conducted in Example 1, thereafter studies for obtaining the aqueous emulsion solution were conducted, in the same manner as in Example 1, using, without any change, the aqueous polymer I-1 solution obtained by neutralizing the A-B block copolymer with ammonia and containing an organic solvent. Specifically, a dropping apparatus was attached to the apparatus similar to that used in Example 1, 123.4 parts of the aqueous polymer I-1 solution obtained in Example 1, namely, 123.4 parts of the aqueous polymer I-1 solution in a state containing BDG, 3.5 parts of 28% ammonia water, and 225.1 parts of ion exchanged water were mixed and made uniform.

Thereafter, 0.6 parts of KPS was added, a mixed solution of 18.5 parts of BA and 43.1 parts of St were gradually dropped in 1.5 hours, and thereafter polymerization was conducted for 5 hours all in the same manner as in Example 1. Precipitation and sedimented matter were not observed in particular, and the aqueous emulsion solution Em-19 was able to be obtained in the same manner as in Em-1 of Example 1. The Em-19 was a bluish white aqueous emulsion solution. The solid content was 25.4%, and pH was 9.1.

The above-described facts show that even the system containing an organic solvent BDG can be polymerized, and in the obtained Em-19, the ratio of the polymer I to the polymer II was 40/60, the composition of the polymer II was BA/St=3/7, and the theoretical Tg of the polymer II was 35° C. Moreover, the particle diameter was 102 nm, the particle diameter was slightly large probably because the Em-19 contains a large amount of styrene, and the Em-19 was an aqueous emulsion solution the color of which was stronger in whiteness than the color of the Em-1 of Example 1.

Examples 20 to 23

Synthesis of Polymers I-2 to I-5 and Emulsions (Em-20 to Em-23) Using Polymers I-2 to I-5

Polymers I-2 to I-5 different from the polymer I-1 obtained in Example 1 were synthesized using the similar apparatus to that in Example 1 in the following manner, and emulsions Em-20 to Em-23 were obtained using the polymers I-2 to I-5. First of all, the polymer block A was synthesized in the following manner. Specifically, in the reaction apparatus, 187.1 parts of tripropylene glycol monomethyl ether as the organic solvent, 1.1 parts of iodine and 4.0 parts of V-70 for the purpose of obtaining an iodine compound as the polymerization initiation compound, 0.9 parts of diphenyl methane as the catalyst, and further 45.4 parts of cyclohexyl methacrylate (hereinafter, abbreviated as CHMA) and 19.0 parts of BzMA were charged, and heated to 40° C. under nitrogen bubbling. The brownish color of iodine disappeared in 3 hours, during which V-70 as the initiator reacted with iodine to produce the polymerization initiation compound as the iodine compound. Thereafter, polymerization was conducted for 5 hours maintaining the above-described temperature, and part of the reaction solution was taken as a sample at the end of polymerization. The solid content of the sampled product was measured to be 27.0%, and the conversion calculated based on the solid content was almost 100%. Moreover, the molecular weight was measured by GPC to find that the number average molecular weight was 4700 and the PDI was 1.11. In the polymer, CHMA/BzMA=70.5/29.5. Further, the sampled product was added to water to find that a resin was precipitated, and it was therefore able to be confirmed that the polymer was a water-insoluble polymer. The polymer block A was obtained in the manner as described above.

Thereafter, the temperature of the reaction solution was set to 40° C., then 18.1 parts of CHMA, 21.6 parts of MMA, and 13.9 parts of MAA were added thereto, and polymerization was conducted for 4.5 hours. Part of the polymerization solution was taken as a sample at the end of polymerization to find that the conversion of the sampled product was almost 100%, and it was therefore confirmed that almost all the monomers were polymerized. Moreover, the molecular weight was measured by GPC to find that the number average molecular weight was 10900 and the PDI was 1.22. It was inferred that the A-B block copolymer was made because the peak of the molecular weight of the polymer block A shifted to a higher molecular weight region and the peak of the polymer block A was almost not observed. Moreover, the molecular weight of the polymer block B calculated from the number average molecular weight of the A-B block copolymer was 10900−4700=6200. Further, in the polymer block B, CHMA/MMA/MAA=33.8/40.3/25.9, and the theoretical acid value of the polymer block B itself was 169.0 mgKOH/g. Furthermore, as the composition of the A-B block copolymer, CHMA/BzMA/MMA/MAA=53.8/16.1/18.3/11.8, and the theoretical acid value was 78.3 mgKOH/g. The acid value of the sampled product after polymerization was measured by the method for measuring the acid value described previously to find that the acid value of the A-B block copolymer was 78.3 mgKOH/g, which was almost equal to the theoretical value.

Thereafter, 24.1 parts of triethanolamine and 163.0 parts of water were added to the polymerization solution obtained above under stirring, then the solution became transparent, and the polymer dissolved. Moreover, the solution was added to water to give an almost transparent aqueous solution with a slightly bluish color. It is considered that the reason is because carboxy groups contained in the polymer block B in the A-B block copolymer were neutralized and ionized and the polymer block B dissolved in water, thereby allowing the A-B block copolymer to be finely dispersed in the solution. From the above-described fact, it is also suggested that the A-B block copolymer specified in the present invention was made. The ratio (content) of the polymer block A was 54.6% in the obtained A-B block copolymer.

Moreover, the solid content of the aqueous solution obtained above was measured to be 25.1%, and the value was almost equal to the theoretical value of blending. Hereinafter, the solution of the polymer-1 is referred to as the aqueous polymer I-2 solution.

Thereafter, the resin was precipitated in the same manner as conducted in Example 1 to obtain water paste of the polymer I-2. The solid content of the water paste was 58.0%, moreover, the acid value was measured to be 78.1 mgKOH/g, the number average molecular weight was 10900, and the PDI was 1.19. Further, when IR spectra were measured for the sample before and after precipitation with an infrared spectrophotometer, no changes were observed. In this manner, the polymer in the polymer I-2 was taken out from the aqueous polymer I-2 solution.

Furthermore, polymers I-3 to I-5 were obtained in the same manner as in the operation by which the polymer I-2 was obtained. Specifically, the monomer components were the same as the monomer components for the polymer I-2, and the polymers I-3 to I-5 as the A-B block copolymers in which the molecular weights and acid values of the polymer block A and polymer block B were changed as shown in Table 6. The physical properties etc. of the obtained polymers are described in Table 6 together with those of the polymer I-2 obtained in Example 20. In the synthesis of the polymer I-3 of Example 21, the amounts of iodine, V-70, and the catalyst were not changed and were set to be the same as in the case of Example 20, and the amount of monomers were as twice as the amount of monomers in Example 20. Moreover, in the synthesis of the polymer I-4 of Example 22, only the amount of the polymer block B was used as twice as the amount of the polymer block B in Example 20. Further, the polymer I-5 of Example 23 is an A-B block copolymer in which: the amount of methacrylic acid of the polymer block B was decreased to a half as compared with the amount of methacrylic acid in the synthesis of the polymer I-4 of Example 22; and further polymerization was conducted in which the decreased amount of methacrylic acid was compensated with MMA. The polymers I-3 to I-5 synthesized in the manner as described above were neutralized with an aqueous triethanolamine solution in the same manner as in Example 20 so that the solid content of the polymerized materials was 40% and the polymer component after neutralization was 25%. Besides, each polymer was precipitated in the same manner as in the synthesis of the polymer I-1 to obtain each water paste.

higher molecular weight region as compared with the peak of the polymer block A, which means the A-B block copolymer was made so as to have a high molecular weight, it was able to be confirmed that the obtained polymer was an A-B block copolymer. Moreover, the value of the PDI of the obtained polymer was in a range that is specified in the present invention. Further, in the cases of the polymer I-4 of Example 22 and the polymer I-5 of Example 23, the ratio of the polymer block B was increased as compared with the ratio of the polymer of Example 20, and therefore it is considered that the PDI of the obtained A-B block copolymer became slightly larger in the same way as in Example 21.

Next, aqueous emulsion solutions were respectively prepared in the same manner as in Example 1 using the polymers I-2 to I-5 synthesized above as shown in Table 7. Moreover, the physical properties of each aqueous emulsion solution are shown together in Table 7.

TABLE 6

Compositions and characters etc. of polymer I-2 to I-5

|  |  | Example 20 | Example 21 | Example 22 | Example 23 |
|---|---|---|---|---|---|
| Block A | Polymer I | Polymer I-2 | Polymer I-3 | Polymer I-4 | Polymer I-5 |
|  | Monomer composition | CHMA/BzMA = 70.5/29.5 | | | |
|  | Number average molecular weight | 4700 | 8900 | 4800 | 4700 |
|  | PDI | 1.11 | 1.24 | 1.13 | 1.12 |
|  | Conversion | Almost 100% | Almost 100% | Almost 100% | Almost 100% |
| Block B | Monomer composition | CHMA/MMA/MAA = 33.8/40.3/25.9 | | | CHMA/MMA/MAA = 33.8/53.2/13 |
|  | Molecular weight | 6200 | 9900 | 8900 | 9200 |
|  | Acid value | 169.0 | 169.0 | 169.0 | 84.8 |
| A-B Block copolymer | Composition | CHMA/BzMA/ MMA/MAA = 53.8/16.1/ 18.3/12 | CHMA/BzMA/ MMA/MAA = 53.8/16.1/ 18.3/12 | CHMA/BzMA/ MMA/MAA = 47.6/11/ 25.2/16.2 | CHMA/BzMA/ MMA/MAA = 47.6/11/ 33.3/8.1 |
|  | Number average molecular weight | 10900 | 18800 | 13700 | 13900 |
|  | PDI | 1.22 | 1.43 | 1.37 | 1.34 |
|  | Acid value | 78.3 | 78.3 | 105.7 | 52.8 |
|  | Ratio of A in A-B | 54.6% | 54.6% | 37.5% | 37.5% |
|  | Conversion | Almost 100% | Almost 100% | Almost 100% | Almost 100% |
| Solid content of water paste | | 58.0% | 66.1% | 55.3% | 65.8% |

In the synthesis of the polymer I-3 of Example 21, the amounts of iodine and V-70 as the initiation compounds were made small for the purpose of making the molecular weight of the polymer I-3 higher, and therefore the PDI of the polymer I-3 became slightly larger than the PDI of the polymer I-2 of Example 20. However, from the fact that, in the GPC, the peak of the A-B block copolymer shifted to a

TABLE 7

Characters etc. of each aqueous emulsion solution

|  | Example 20 | Example 21 | Example 22 | Example 23 |
|---|---|---|---|---|
| Name of aqueous emulsion solution | Em-20 | Em-21 | Em-22 | Em-23 |
| Polymer I used | I-2 | I-3 | I-4 | I-5 |
| Polymer ratio (I/II) | 50/50 | 50/50 | 35/65 | 35/65 |
| Polymer II composition | BMA/St = 7/3 | BMA/St = 7/3 | MMA/BMA/BA = 53/30/17 | MMA/BMA/BA = 53/30/17 |
| Theoretical Tg (° C.) of polymer II | 47.5 | 47.5 | 60 | 60 |
| Average particle diameter (nm) | 79 | 89 | 90 | 103 |
| Solid content (%) | 25.1 | 25.3 | 25.2 | 25.1 |
| pH | 9.1 | 9.1 | 9.2 | 9.2 |
| Viscosity (mPa · s) | 5.9 | 9.0 | 9.4 | 8.4 |

As shown in Table 7, the particle diameter of the emulsion was larger and the viscosity was higher in Example 21 where the polymer I-3 was used as compared with Example 20 where the polymer I-2 was used although the mass ratios of the polymer I to the polymer II for the polymer I-2 and the polymer I-3 were the same in Example 20 and Example 21. The following is considered as the cause. That is to say, it is considered that since the molecular weight of the polymer block A in the Polymer I-3 was large, the particle diameter of the polymer block A was large in water, namely the average particle diameter was already as large as 50 nm, when the polymer I-3 dissolved in water, and the particle diameter of the obtained emulsion also became large, and moreover, since the polymer block B had a high acid value and a large molecular weight, the viscosity of the aqueous emulsion solution became large. The polymer I-4 used in Example 22 was finely dispersed in the same way as the polymer I-1 of Example 1, and the average particle diameter of the polymer block A was not able to be measured. The polymer I-2 used in Example 20 was the same in this regard. However, as shown in Table 7, it is considered that, in the emulsion particles of Em-22 of Example 22, the large amount of the polymer II was incorporated in the finely dispersed particles of the polymer I-4 due to the difference in the mass ratio of the polymer I to the polymer II, thereby increasing the particle diameter of the emulsion and also making the viscosity high. In the polymer I-5 used in Example 23, the molecular weight of the polymer block B was large, however, as shown in Table 6, since the polymer block B of polymer I-5 had a lower acid value as compared with the other polymers I, it is considered that the solubility of the polymer block B of the polymer I-5 was lowered and even though the polymer I-5 incorporated the polymer II, the polymer block B was not extended and existed near the particle when the polymer block B dissolved in water, thereby making the particle diameter of the emulsion apparently large.

Examples 24 to 28

Emulsions (Em-24 to Em-28) Using Polymer I-1

Aqueous emulsion solutions Em-24 to Em-28 of Examples 24 to 28 of the present invention were each obtained in the same manner as in Example 1 with respect to each polymer composition, each blending amount, and so on by changing the ratio of the polymer I to the polymer II so that the ratio of the polymer I as the protective colloid to the polymer II as the coating-film component became as described in Table 8. These emulsions were emulsions in which the content of the polymer I was made small and the ratio of the polymer II as the high molecular weight polymer was increased.

As it is clear from Table 8, the average particle diameter becomes smaller as the ratio of the polymer I as the protective colloid is larger, and, on the other hand, the average particle diameter becomes larger as the ratio of the polymer II is larger. Moreover, it was able to be confirmed that all of the aqueous emulsion solutions of Em-24 to Em-28 had a low viscosity. Further, surprisingly, it was found that precipitation or aggregation hardly occurred and stable emulsions was able to be obtained even when the amount of the polymer I was small. Furthermore, it was also able to be confirmed that the viscosity was lowered more as the amount of the polymer I having a dissolving polymer block A was decreased more.

Comparative Example 1

Synthesis of Random Polymer and Emulsion Using Random Polymer

A dropping apparatus was attached to the similar apparatus to that of Example 1, and 828.4 parts of BDG was charged therein and heated to 65° C. In another container, 447.8 parts of BzMA, 19.8 parts of HEMA, and 57.2 parts of MAA were mixed and stirred, and 21.0 parts of 2,2'-azobis(2,4-dimethylvarelonitrile) (hereinafter, abbreviated as V-65) was added to dissolve V-65 in the monomer solution. And, the resultant mixture was charged in the dropping apparatus, one third of the mixed solution of the monomers was added, and then dropping was conducted in 1.5 hours. Polymerization was conducted at the temperature for 6 hours, then 40.3 parts of 28% ammonia water and 235.8 parts of water were added to give a transparent solution.

Moreover, the neutralized resin solution was added to water to give a transparent aqueous solution. This is clearly different from the fact that the block copolymers of Examples of the present invention gave almost transparent aqueous solutions with a slightly bluish color. The difference was brought about because, in the A-B block copolymers used in Examples of the present invention, the polymer block A portion forms particles, however carboxy groups are randomly introduced in the polymer of Comparative Example 1 and therefore the polymer of Comparative Example 1 as a whole dissolved in water by the carboxy groups being neutralized with an alkali. The polymer of Comparative Example 1 had a number average molecular weight of 11000 and a PDI of 1.92. The solid content was 33.3%, and the conversion was almost 100%. The acid value was 71.3 mgKOH/g. The polymer is a random copolymer consisting of the whole composition of the A-B block copolymer of Example 1.

Thereafter, the solution of the polymer of Comparative Example 1 was precipitated in the same manner as in Example 1 to obtain water paste. The solid content was

TABLE 8

| Characters etc. of each aqueous emulsion solution | | | | | |
|---|---|---|---|---|---|
|  | Example 24 | Example 25 | Example 26 | Example 27 | Example 28 |
| Name of aqueous emulsion solution | Em-24 | Em-25 | Em-26 | Em-27 | Em-28 |
| Polymer ratio (I/II) | 30/70 | 25/75 | 20/80 | 15/85 | 10/90 |
| Polymer I used | Polymer I-1 | | | | |
| Polymer II composition | BA/EDMA = 98/2 | | | | |
| Tg of polymer II | About −54° C. | | | | |
| Average particle diameter (nm) | 84 | 97 | 117 | 147 | 210 |
| Solid content (%) | 25.1 | 25.0 | 25.0 | 24.8 | 24.7 |
| pH | 9.0 | 9.0 | 8.9 | 8.7 | 8.7 |
| Viscosity (mPa · s) | 5.9 | 5.7 | 4.9 | 4.7 | 4.7 |

65.0%. The acid value was measured to be 71.0 mgKOH/g, the number average molecular weight was 11000, and the PDI was 1.89. Moreover, when IR spectra were measured for the sample before and after precipitation with an infrared spectrophotometer, no changes were observed. Thereafter, an aqueous emulsion solution was synthesized using the water paste in the same manner as in Example 1. The water paste was neutralized with an alkali to give a transparent aqueous solution, and dissolved in water. When laser light was applied on the solution, a Tyndall phenomenon was not observed.

Thereafter, 0.6 parts of KPS (potassium persulfate) was added to the above-described aqueous solution after confirming that the temperature reached 75° C., and a mixed solution of 43.1 parts of BA and 18.5 parts of St was dropped into the aqueous solution in 2 hours. Then, the transparent solution gradually changed its color to yellowish white by conducting polymerization while dropping the monomers to become an aqueous emulsion solution, thereby forming the comparative polymer II. After the completion of dropping, polymerization was conducted for 5 hours, and the polymerization solution was cooled and taken out. As a result thereof, a yellowish white aqueous emulsion solution with a slightly transparent feel was obtained. This aqueous emulsion solution is referred to as comparative Em.

The solid content of the comparative Em was measured to be 25.1%, which was almost equal to the theoretical value. Moreover, the average particle diameter, when measured with a light scattering particle size distribution measuring apparatus, was 79 nm. The pH was 9.0. Moreover, the viscosity was 20.5 mPa·s and was outstandingly higher as compared with aqueous emulsion solutions of Examples.

That was as a result of the fact that the random polymer which was used as the protective colloid in the comparative Em was water-soluble, not an A-B block copolymer as used in Examples of the present invention, and therefore the viscosity was higher because the random polymer dissolved in water. In the comparative Em, the ratio of the random polymer as the protective colloid to the polymer II as the coating film component is 40:60. Moreover, the composition of the polymer II in the comparative Em is BA/St=70:30, and Tg is −23° C. Further, the molecular weight was measured to find that the peak of the polymer II corresponding to a higher molecular weight component and the peak of the random polymer as the protective colloid were measured in such a way that both peaks overlapped. Furthermore, the molecular weight at the peak top of the polymer II was 100000.

Example 29

Preparation of Dye-Based Ink

A dye-based ink was prepared according to the following combination using the aqueous emulsion solution Em-1 obtained in Example 1.

| | |
|---|---|
| Direct Blue 86 | 5 parts |
| Aqueous emulsion solution Em-1 obtained in Example 1 | 8 parts |
| 1,2-Hexanediol | 3 parts |
| Glycerin | 15 parts |
| Propylene Glycol | 15 parts |
| Surfynol 465 (manufactured by Air Products) | 1 part |
| Water | 53 parts |

The above materials were blended, well mixed, and made uniform using a disper, and the resultant mixture was filtrated with a 10 μm membrane filter. The viscosity of the obtained ink was 3.59 mPa·s.

Comparative Example 2

Preparation of Dye-Based Ink

Moreover, a dye-based ink was prepared in the same manner as in Example 1 using the comparative Em, the emulsion obtained in Comparative Example 1 in place of the aqueous emulsion solution Em-1 of Example 1 used in Example 29. The viscosity of the obtained ink was 4.51 mPa·s. That is to say, the results were that the viscosity was low in the case where the aqueous emulsion solution of Example 29 of the present invention was used and the viscosity was high in the case of the ink of Comparative Example 2 where the comparative Em was used. It is considered that the reason is because the comparative Em is a water-soluble polymer and therefore the viscosity of the ink was increased.

(Evaluation)

Dye-based inks of Example 29 and Comparative Example 2 were filled in a cartridge respectively, and solid printing was conducted for each color on Xerox paper 4024 (product name) manufactured by Xerox Corporation, U.S., using an inkjet printer EM-930C (product name) manufactured by Seiko Epson Corporation with a high speed draft printing mode. As a result thereof, with respect to printing with the ink of Example 29 using the Em-1 of Example 1, a favorable printing state was exhibited without the occurrence of clogging of the head and the occurrence of blurring and a stripe in the printed matter even when 100 sheets of paper were printed. However, with respect to the ink of Comparative Example 2 using the comparative Em, a stripe was observed in the printed portion during printing of 10 sheets of paper, the number of stripes and blurring was gradually increasing, and it became impossible to conduct printing at the 31st sheet. It is considered that the reason for this is because the polymer used for the ink of Comparative Example was water-soluble and therefore the viscosity of the ink was high and because the ink had non-Newtonian viscosity due to a large amount of dissolved polymer components and therefore the ink was deficient in ejection stability. On the other hand, in the case of the ink of Example of the present invention, it is considered that the reason is because the coating film component was in a particle form to make the viscosity of the ink low and therefore the ejection stability became favorable.

Moreover, the printer was left standing for 24 hours after printing was once stopped, then the similar printing test was conducted once again, and the redissolvability of the ink was tested. As a result thereof, printing was able to be conducted with the ink of Example 29 without any problem. However, printing was not able to be conducted with the ink of Comparative Example 2. It is considered that the reason is because the polymer block B having a high acid value in the block copolymer in the ink easily dissolved in water in the case of the ink of Example 29 of the present invention and therefore the ink exhibited redissolvability again even when the ink dried in the head, which made it possible to conduct printing.

The above-described test was conducted for each of the inks prepared using the aqueous emulsion solutions Em-2 to Em-5 of Examples 2 to 5 respectively in place of the aqueous emulsion solution Em-1, and the results similar to those for Example 1 was able to be obtained. Particularly, it became clear that printing was able to be conducted without any problem even with the emulsion in which a large amount of protective colloid was contained, such as Example 5, and it was found that it was important to be in the form of particles. Moreover, any printed matter obtained with the inks containing the aqueous emulsion solution of Examples had favorable adhesiveness because the printed portion was not scratched off even when the printed matter immediately after printing or the printed matter which was left standing for 1 hour after printing was rubbed with a finger.

Example 30

Preparation of Red Pigment Coloring Composition for Inkjet and Aqueous Red Pigment-Based Ink A pigment-based ink was obtained using the aqueous emulsion solution Em-6 prepared in Example 6 in the following manner. A mill base was prepared by mixing and stirring with a disper 200 parts of C.I. Pigment Red 122 (dimethyl quinacridone pigment: manufactured by Dainichiseika Color & Chemicals Mfg. Co., Ltd.) as a red pigment, 120 parts of the aqueous solution of the polymer I-1 prepared in Example 1 as the pigment dispersant, 80 parts of BDG, and 400 parts of water. Thereafter, dispersion treatment was conducted using a transverse type media disperser "DYNO-MILL 0.6 L ECM type" (product name, manufactured by Shinmaru Enterprises Corporation, zirconia beads; diameter 0.5 mm) at a circumferential speed of 10 m/s. Dispersion was completed at 2 hours from the inception of dispersion. Thereafter, the dispersed liquid was subjected to centrifugal separation treatment (7500 rpm, 20 minutes), then the pigment solution was filtrated with a 10 μm membrane filter, and the pigment concentration was adjusted with ion-exchanged water to prepare a pigment dispersion liquid having a pigment concentration of 14%. The average particle diameter of the pigment solution was measured to find that the average particle diameter was 102 nm. The viscosity was 3.66 mPa·s.

Thereafter, using the aqueous red pigment dispersion liquid for inkjet, 22.4 parts of the aqueous emulsion solution Em-6 obtained in Example 6, 1.8 parts of BDG, 5 parts of 1,2-hexanediol, 10 parts of glycerin, 1 part of Surfynol 465, and 20.2 parts of water were added to 40 parts of the above-described pigment dispersion liquid, and the resultant mixture was stirred. After the mixture was stirred well, filtration was conducted with a membrane filter having a pore size of 10 μm to obtain a aqueous red pigment-based inkjet ink-1. The viscosity was 2.99 mPa·s.

Example 31

Preparation of Blue, Yellow, and Black Pigment Coloring Compositions for Inkjet and Aqueous Blue, Yellow, and Black Pigment-Based Inkjet Inks Blue, yellow, and black pigment coloring compositions for inkjet and blue, yellow, and black pigment-based inkjet inks were prepared in the same manner as in Example 30. That is to say, C.I. Pigment Blue 15:3 (manufactured by Dainichiseika Color & Mfg., Co., Ltd., Cyanine Blue A220JC) as a blue pigment, C.I. Pigment Yellow 74 (manufactured by Dainichiseika Color & Mfg., Co., Ltd., Seika Fast Yellow 2016G) as a yellow pigment, and C.I. Pigment Black 7 (manufactured by Deggsa, S170) as a black pigment were used respectively in place of the red pigment used in Example 30 to obtain blue, yellow, and black color pigment dispersion liquids respectively. The each average particle diameter and each viscosity of the obtained color pigment dispersion liquids are shown in Table 9.

TABLE 9

| Characters of each color pigment dispersion liquid | | | |
|---|---|---|---|
| | Blue pigment dispersion liquid | Yellow pigment dispersion liquid | Black pigment dispersion liquid-1 |
| Average pigment particle diameter after dispersion | 111 nm | 120 nm | 131 nm |
| Viscosity (mPa · s) | 3.12 | 2.80 | 4.00 |

Thereafter, aqueous blue, yellow, and black pigment-based inkjet inks were respectively prepared using the blue, yellow, and black color pigment dispersion liquids obtained above respectively in the same manner as in Example 30 except that the aqueous emulsion solution Em-6 used in Example 30 was changed to the followings. Specifically, the following emulsions were respectively used as an emulsion binder to be added to respective inks to obtain the following inks. Specifically, the aqueous emulsion solution Em-7 obtained in Example 7 was used to obtain an aqueous blue pigment-based inkjet ink (viscosity 2.55 mPa·s). The aqueous emulsion solution Em-15 obtained in Example 15 was used to obtain an aqueous yellow pigment-based inkjet ink (viscosity 2.22 mPa·s). The aqueous emulsion solution Em-11 obtained in Example 11 was used to obtain an aqueous black pigment-based inkjet ink-1 (viscosity 3.23 mPa·s). As a result thereof, it was confirmed that lowering viscosity was achieved in all the prepared inks.

High speed printing test was conducted using each color ink prepared above in the same manner as conducted in Example 29 to evaluate inks. As a result thereof, all the inks prepared in Example 31 exhibited a favorable printability. Moreover, it was also able to be confirmed that, in the case where each color ink of Examples described above was used, water solubility attributable to a high acid value of the polymer block B in the added emulsion binder was imparted to the inks and therefore even when the ink dried in the head, the ink immediately dissolved in such a way that printing was able to be conducted.

Moreover, each color ink prepared in Example 31 described above was left standing at 70° C. for 1 week to find that no changes were observed in the average particle diameter and the viscosity. It is considered that the reason is because the dispersant for dispersing pigments and the protective colloid of the emulsion particles were the same, namely the polymer I-1, and therefore the stability was improved. The characters of each ink prepared in Example 31 are shown together in Table 10.

TABLE 10

Characters of each aqueous color pigment-based ink

|  | Aqueous red pigment-based ink | Aqueous blue pigment-based ink | Aqueous yellow pigment-based ink | Aqueous black pigment-based ink-1 |
|---|---|---|---|---|
| Average pigment particle diameter in ink (nm) | 102 | 111 | 120 | 131 |
| Viscosity (mPa · s) immediately after ink preparation | 2.99 | 3.12 | 2.80 | 4.00 |
| Average particle diameter (nm) after storage at 70° C. | 103 | 110 | 115 | 122 |
| Viscosity (mPa · s) after storage | 3.00 | 3.12 | 2.87 | 4.02 |

Moreover, solid pattern printing was conducted using the aqueous pigment-based inkjet inks prepared in Examples 30 and 31 respectively and also using a PET film and a vinyl chloride sheet in place of plain paper used in the printing test conducted in Example 29. And, after printing, the printed films and sheets were put in a dry oven at 70° C. for 5 minutes for drying. As a result thereof, all the printed portions had favorable film physical properties, any of the printed matter was not peeled off even in a tape peel test in which a sellotape (registered trade mark) was stuck to the printed portion and then the sellotape was peeled off at once (hereinafter, referred to as a tape peel test), and further, any of the printed matter was not scratched off even when the printed matter was scratched with a nail. That is to say, it was confirmed that all of the above-described inks exhibited a favorable film adhesiveness.

Example 32

Preparation of Yellow Pigment-Based Inkjet Ink

An ink was prepared in the same manner as in Example 31 except that the Em-15 used for the aqueous yellow pigment-based ink prepared in Example 31 was changed to the Em-9. And solid pattern printing was conducted in the same manner as described previously using the obtained aqueous pigment-based inks to also give favorable sheets of printed matter that were excellent in ejection stability, redissolvability, and film physical properties. The two sheets of solid pattern-printed matter were subjected to ultraviolet ray irradiation for 10 hours with super UV. As a result thereof, the color difference between before irradiation and after irradiation was 1.00 or less for the ink using the Em-15, however the color difference for the ink using the Em-9 was 2.00 or more, and the yellow pigment was not scarcely faded in the ink using the Em-15. It is considered that this is because the ultraviolet ray-absorbing groups contained in the polymer II of Em-15 absorbed ultraviolet rays, thereby improving the light fastness of the yellow pigment in the ink using the Em-15.

[Preparation of Black Pigment-Based Inkjet Inks-2 to 6]

Inks were respectively prepared in the same manner as in Example 30 using the black pigment dispersant-1 prepared in Example 31 and also using the aqueous emulsion solutions Em-1, Em-8, Em-12, Em-13, and Em-14 respectively as the emulsion binder. The physical properties of the obtained inks were as follows. The physical properties of the obtained inks are shown in Table 11 together with those of the aqueous black pigment-based ink-1 obtained previously.

TABLE 11

Characters of aqueous black pigment-based ink

|  | Aqueous black pigment-based ink | | | | | |
|---|---|---|---|---|---|---|
|  | -1 | -2 | -3 | -4 | -5 | -6 |
| Aqueous emulsion solution | Em-11 | Em-1 | Em-8 | Em-12 | Em-13 | Em-14 |
| Average pigment particle diameter (nm) | 131 | 129 | 130 | 132 | 130 | 131 |
| Ink viscosity (mPa · s) immediately after preparation | 4.00 | 4.02 | 4.02 | 4.03 | 4.03 | 4.02 |

The black pigment-based inks 1 to 6 obtained above were respectively filled in the cartridge for the apparatus used for the evaluation tests described previously and printed on a shrinkable PET film (thickness 40 thermal shrinkage at 90° C. for 10 seconds of 76%) in a vertical belt-like pattern having a width of 5 cm, then the printed matter was dried, and labels were made to evaluate each ink. As a result thereof, it was confirmed that printing was able to be conducted without any problem with all the inks in the same way as described previously, and it was also confirmed that the redissolvability of all the inks was favorable. The sellotape peel test was conducted as an adhesiveness test without shrinking the labels to find that all the sheets of the printed matter exhibited a favorable adhesiveness without peel-off.

Next, each of the labels obtained above was fixed on a plate and was subjected to heat treatment by immersing the plate in hot water at 90° C. for 10 seconds to shrink the labels by 50%. The tape peel test as described previously and a hand crumple test in which the shrink label was crumpled 100 times by hand to check whether the coating film was detached or not were conducted for the shrink labels. As a result thereof, the aqueous black pigment-based inks-1, -4, -5, and -6 exhibited a favorable adhesiveness without peel-off of the coating films in the tape peel test and almost without detachment also in the hand crumple test. However, in the aqueous black pigment-based ink-2, a phenomenon in which the film was peeled off in the whole Sellotape®—stuck portion was observed in the tape peel test, and the film was slightly detached also in the hand crumple test, probably because Tg was low. It is suggested from these results that it is more preferable that even the aqueous emulsion solution of the present invention is used adjusting the Tg in accordance with the use application. Moreover, with the aqueous black pigment-based ink-3, the performance of adhesiveness was not able to be obtained to a level where the aqueous black pigment-based inks-1, -4, -5, and -6 reached in the tape peel test to the shrink label, and the result of the aqueous black pigment-based ink-3 was that part of the sellotape-stuck portion was peeled off in the tape peel test. It is considered that the emulsion used for the aqueous black pigment-based ink-3 is the polymer II having a crosslinked structure and therefore the aqueous black pigment-based ink-3 exhibited a more favorable adhesiveness than the aqueous black pigment-based ink-2 in which the emulsion used for the aqueous black pigment-based ink-2 does not have a crosslinked structure. Moreover, when the same tests were conducted with the emulsions Em-24 to Em-28 obtained in Examples 24 to 28 respectively, the similar results to those described above were able to be obtained.

Example 34

Preparation of Yellow Pigment Coloring Compositions for Inkjet and Yellow Pigment-Based Inkjet Inks Yellow pigment dispersion liquids were obtained in the same manner as in Example 30 using, respectively, the aqueous solutions of the polymer I-2 to I-5 obtained in Examples 20 to 23 as the pigment dispersant. In preparing the pigment dispersion liquids, an azo-based yellow pigment PY-74 being a yellow pigment (Seika Fast Yellow 2016G/ manufactured by Dainichiseika Color & Chemicals Mfg., Co., Ltd.) was used as the pigment. The results are shown in Table 12 together with the results of storage stability test. As shown in Table 12, all of the obtained pigment dispersion liquids had finely dispersed pigments and had a high storage stability.

TABLE 12

Characters of yellow pigment coloring compositions

| Dispersant | Average particle diameter (nm) | Viscosity (mPa · s) | pH | After storage at 70° C. for 1 week | | Yellow pigment dispersion liquid |
|---|---|---|---|---|---|---|
| | | | | Average particle diameter (nm) | Viscosity (mPa · s) | |
| Polymer I-2 | 112 | 3.1 | 8.9 | 110 | 3.1 | -1 |
| Polymer I-3 | 125 | 3.5 | 9.0 | 122 | 3.4 | -2 |
| Polymer I-4 | 112 | 3.6 | 8.9 | 113 | 3.6 | -3 |
| Polymer I-5 | 117 | 3.0 | 8.8 | 117 | 3.1 | -4 |

Next, inks were prepared in the same manner as in Example 30 using the yellow pigment coloring compositions obtained above respectively. In preparing inks, the aqueous emulsion solutions of Examples 20 to 23 were added respectively to respective pigment dispersion liquids. The main components and physical properties of inks are shown in Table 13 together with the results of the storage stability test at 70° C. for 1 week.

TABLE 13

Main composition and characters of inks

| | Yellow pigment dispersion liquid | Aqueous emulsion solution | Viscosity (mPa · s) | After storage at 70° C. for 1 week | |
|---|---|---|---|---|---|
| | | | | Average particle diameter (nm) | Viscosity (mPa · s) |
| Example 30 | -1 | Em-20 | 3.3 | 111 | 3.2 |
| Example 31 | -1 | Em-21 | 3.5 | 110 | 3.3 |
| Example 32 | -1 | Em-22 | 3.6 | 110 | 3.4 |
| Example 33 | -1 | Em-23 | 3.3 | 111 | 3.3 |
| Example 34 | -2 | Em-20 | 3.5 | 121 | 3.4 |
| Example 35 | -2 | Em-21 | 3.7 | 124 | 3.7 |
| Example 36 | -2 | Em-22 | 3.7 | 124 | 3.8 |
| Example 37 | -2 | Em-23 | 3.4 | 125 | 3.3 |
| Example 38 | -3 | Em-20 | 3.6 | 113 | 3.6 |
| Example 39 | -3 | Em-21 | 3.9 | 111 | 3.8 |
| Example 40 | -3 | Em-22 | 4.1 | 112 | 3.9 |
| Example 41 | -3 | Em-23 | 3.8 | 112 | 3.8 |
| Example 42 | -4 | Em-20 | 3.0 | 117 | 3.1 |
| Example 43 | -4 | Em-21 | 3.3 | 117 | 3.3 |
| Example 44 | -4 | Em-22 | 3.2 | 118 | 3.3 |
| Example 45 | -4 | Em-23 | 3.2 | 117 | 3.2 |

As shown in Table 13, even when the dispersant used for the pigment dispersion liquid and the composition of the polymer I in the aqueous emulsion solution contained in the ink were different, the similar ink stability to the ink stability in the case where, as shown previously, the dispersant used for the pigment dispersion liquid and the composition of the polymer I in the aqueous emulsion solution contained in the ink were the same. As one of the reasons, it is considered that the polymer block B that is the water-soluble portion of the polymer I in the aqueous emulsion solution contained, as the emulsion binder, in the ink and the polymer block B of the polymer I used as the pigment dispersant had the same composition and therefore the ink exhibited a high stability regardless of the composition ratio. Next, the inks were respectively filled in the cartridge and printing test was conducted as described previously, the same printing properties as described previously were obtained with any of the inks, and, moreover, it was able to be confirmed that the inks were excellent in ejection stability and ink redissolvability.

INDUSTRIAL APPLICABILITY

Utilization examples of the present invention include an inkjet ink in which the aqueous emulsion solution of the present invention containing a high molecular weight polymer component formed from the polymer II and using the polymer I, as the protective colloid, making use of the A-B block copolymer having a particular structure is added therein as the binder for forming a coating film. The ink is the one: in which lowering viscosity can be achieved; which is excellent in both high speed printability and ink redissolvability; and by which high adhesiveness to films can be realized, and an inkjet ink that is suitable for an inkjet printing system where high speed printing is required can be provided by the present invention, and the future development is expected.

The invention claimed is:

1. An aqueous emulsion solution comprising:
a polymer I;
a water-insoluble polymer II; and
water,
wherein the polymer I and the polymer II are dispersed together in the water and form an emulsion in a manner as the polymer II is incorporated in a particle of the polymer I,
the polymer I is an A-B block copolymer formed from 90 mass % or more of a methacrylate-based monomer and satisfying following (1) and (2) and (3):
(1) a polymer block A is substantially water-insoluble and has number average molecular weight in a range from 1000 to 10000 and a polydispersity index in a range of 1.5 or less;
(2) a polymer block B is synthesized using, as a polymer block-forming component, a monomer comprising methacrylic acid and has an acid value from 30 to 250 mgKOH/g; and
(3) the A-B block copolymer comprising the polymer blocks A and B has number average molecular weight in a range from 5000 to 20000, a content of the polymer block A in a range from 5 to 60 mass % in the A-B block copolymer, and a polydispersity index in a range of 1.6 or less,
the A-B block copolymer as the polymer I is present as a water-insoluble particle having the polymer II incorporated therein,
the polymer II is a polymer formed from a monomer comprising a hydrophobic addition polymerizable monomer and has a glass transition temperature of 70° C. or lower,
the polymer II as a hydrophobic addition polymer, is incorporated in the A-B block copolymer dispersed in an aqueous solution, wherein the A-B block copolymer is neutralized with an alkali so that the hydrophobic addition polymerizable monomer forms the polymer II incorporated in the polymer I by radical polymerization, and
a mass ratio of the polymer I to the polymer II is in a range from 5:95 to 80:20.

2. The aqueous emulsion solution according to claim 1, wherein the hydrophobic addition polymerizable monomer is at least one monomer selected from the group consisting of styrene, vinyl toluene, and (meth)acrylate having an aliphatic group, an alicyclic group, or an aromatic group that have a number of carbon atoms from 1 to 18.

3. The aqueous emulsion solution according to claim 1, wherein the polymer block A is formed from, as a polymer block-forming component, a monomer comprising a methacrylate monomer having an aromatic group or an aliphatic group.

4. The aqueous emulsion solution according to claim 1, wherein the particles formed by the A-B block copolymer having the polymer II have an average particle diameter from 20 to 300 nm when measured by a light scattering method.

5. A coloring agent composition comprising:
a dye, a pigment, or a combination thereof;
water;
a water soluble organic solvent; and further
the aqueous emulsion solution comprising the polymer I and the polymer II therein according to claim 1.

6. A pigment-containing coloring agent composition comprising:
a pigment;
water;
a water soluble organic solvent;
a pigment dispersant; and further
the aqueous emulsion solution according to claim 1, which comprises the polymer I and the polymer II incorporated in the polymer I.

7. The pigment-containing coloring agent composition according to claim 6,
wherein the pigment dispersant in the coloring agent composition comprises an A-B block copolymer that is the same as the A-B block copolymer as the polymer I in the aqueous emulsion solution.

8. An aqueous inkjet ink comprising the coloring agent according to claim 5.

9. An aqueous inkjet ink comprising the pigment-containing coloring agent composition according to claim 6,
wherein an amount of polymer components derived from the aqueous emulsion solution is in a range from 50 to 300 mass parts relative to 100 mass parts of the pigment in the coloring agent composition.

10. A method for producing the aqueous emulsion solution according to claim 1, comprising:
adding a monomer comprising a hydrophobic addition polymerizable monomer to an aqueous solution, which is obtained by dissolving the polymer I in water through neutralizing the polymer I with an alkali; and
subjecting the hydrophobic addition polymerizable monomer to radical polymerization and forming the water-insoluble polymer II that has a glass transition temperature of 70° C. or lower, thereby obtaining the aqueous emulsion solution.

11. The method for producing an aqueous emulsion solution according to claim 10, wherein the A-B block copolymer is produced by subjecting a methacrylate-based monomer to living radical polymerization in the presence of a polymerization initiation compound, wherein the polymerization initiation compound comprises an iodine compound.

12. The method for producing an aqueous emulsion solution according to claim 11,
wherein a catalyst is present in the living radical polymerization, and the catalyst is at least one material selected from the group consisting of phosphorus halides, phosphite-based compounds, phosphinate compounds, imide-based compounds, phenol-based compounds, diphenylmethane-based compounds, and cyclopentadiene-based compounds.

13. A coloring agent composition comprising:
at least one material selected from the group consisting of a dye and a pigment;
water;
a water soluble organic solvent; and
an aqueous emulsion solution obtained by the method for producing an aqueous emulsion solution according to claim 10.

14. An aqueous inkjet ink comprising the coloring agent composition according to claim 13 as a component.

15. The method for producing an aqueous emulsion solution according to claim 10,
wherein the hydrophobic addition polymerizable monomer is at least one monomer selected from the group consisting of styrene, vinyl toluene, and (meth)acrylate having an aliphatic group, an alicyclic group, or an aromatic group that has a number of carbon atoms from 1 to 18.

16. The aqueous emulsion solution according to claim 1, wherein the polymer II has a peak top molecular weight of 50000 or larger.

\* \* \* \* \*